United States Patent
Nagata et al.

(10) Patent No.: US 9,418,768 B2
(45) Date of Patent: Aug. 16, 2016

(54) RADIOGRAPHIC IMAGE CONVERSION PANEL AND RADIOGRAPHIC IMAGE DETECTOR

(71) Applicant: Konica Minolta, Inc., Tokyo (JP)

(72) Inventors: Yasushi Nagata, Kodaira (JP); Keiko Maeda, Hachioji (JP); Musashi Matsumoto, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 12 days.

(21) Appl. No.: 14/287,567

(22) Filed: May 27, 2014

(65) Prior Publication Data

US 2014/0353508 A1    Dec. 4, 2014

(30) Foreign Application Priority Data

May 30, 2013    (JP) .................... 2013-114063

(51) Int. Cl.
 G21K 4/00    (2006.01)
 G01T 1/202    (2006.01)
 G01T 1/20    (2006.01)

(52) U.S. Cl.
 CPC . G21K 4/00 (2013.01); G01T 1/202 (2013.01); G01T 1/2018 (2013.01); G21K 2004/06 (2013.01)

(58) Field of Classification Search
 CPC .... G21K 4/00; G21K 2004/06; G01T 1/2018; G01T 1/202
 See application file for complete search history.

(56) References Cited

U.S. PATENT DOCUMENTS

2011/0017913 A1*  1/2011  Kasai et al. ............... 250/361 R
2012/0312997 A1*  12/2012  Iwakiri et al. ................ 250/366

FOREIGN PATENT DOCUMENTS

JP    2001-059899    3/2001
WO    2010/032503    3/2010

OTHER PUBLICATIONS

John Rowlands, "Amorphous Semiconductor Usher in Digital X-ray Imaging", Physics Today, November issue, 24 (1997) (8 pages).
L. E. Antonuk, "Development of a High Resolution Active Matrix Flat-Panel Imager with Enhanced Fill Factor", SPIE, 32, 2 (1997) (13 pages).

* cited by examiner

Primary Examiner — Yara B Green
(74) Attorney, Agent, or Firm — Lucas & Mercanti, LLP

(57) ABSTRACT

An object of the invention is to provide radiographic image conversion panels which realize high levels of brightness and sharpness when used as scintillator panels and which also ensure sufficient strength resisting pressure applied in the film thickness direction. A radiographic image conversion panel of the invention includes a support and a scintillator layer disposed on the support. The scintillator layer includes a plurality of columnar crystals containing a phosphor. The plurality of columnar crystals have root portions, and the root portions are spaced apart from one another.

17 Claims, 7 Drawing Sheets

RADIOGRAPHIC IMAGE CONVERSION PANEL AND RADIOGRAPHIC IMAGE DETECTOR

CROSS REFERENCE TO RELATED APPLICATION

This U.S. patent application claims priority under the Paris Convention of Japanese Patent Application No. 2013-114063 filed on May 30, 2013, the entirety of which is incorporated herein by reference.

BACKGROUND OF THE INVENTION

1. Field of the Invention

The present invention relates to radiographic image conversion panels and radiographic image detectors used in the formation of radiographic images.

2. Description of the Related Art

Radiographic images such as X-ray images have been widely used in medical diagnosis of disease conditions. In particular, radiographic images based on intensifying screen-film combinations have undergone enhancements in terms of sensitivity and image quality during a long history and consequently remain in use in the medical field worldwide as the imaging system with high reliability and excellent cost performance. However, this image information is analogue and thus cannot be processed freely or transmitted instantaneously in contrast to currently developing digital image information.

Recently, digital radiographic image detectors such as computed radiography (CR) systems and flat panel detectors (FPDs) have come in use. These radiographic image detectors directly give digital radiographic images and allow the images to be directly displayed on displays such as cathode ray tube panels and liquid crystal panels. Thus, there is no need for the images to be created on photographic films. Consequently, the digital X-ray image detectors have decreased a need for the image formation by silver halide photography and have significantly enhanced diagnostic convenience at hospitals and clinics.

The computed radiography (CR) is one of the digital X-ray image techniques currently used in medical practice. However, CR X-ray images are less sharp and are insufficient in spatial resolution as compared to screen film system images such as by silver halide photography, and the level of their image quality compares unfavorably to the quality level of screen film system images. Thus, new digital X-ray image techniques, for example, flat panel detectors (FPDs) involving thin film transistors (TFTs) have been developed (see, for example, Non Patent Documents 1 and 2).

In principle, a FPD converts X-rays into visible light. For this purpose, a scintillator panel is used which has a phosphor (scintillator) layer made of an X-ray phosphor that, when illuminated with X-rays, convert the radiations into visible light that is emitted. In X-ray photography using a low-dose X-ray source, it is necessary to use a scintillator panel with high luminous efficiency (X-ray to visible light conversion) in order to enhance the ratio (the SN ratio) of signal to noise detected from the scintillator panel. In general, the luminous efficiency of scintillator panels is determined by the thickness of the scintillator layer (the phosphor layer) and the X-ray absorption coefficient of the phosphor. The light produced in the phosphor layer upon illumination with X-rays is scattered more markedly in the scintillator layer with increasing thickness of the phosphor layer, and consequently the sharpness of X-ray images obtained via the scintillator panel is lowered. Thus, setting of the sharpness required for the quality of X-ray images automatically determines the critical thickness of the phosphor layer in the scintillator panel.

Further, the shape of phosphor constituting a phosphor layer is also important in order for scintillator panels to exhibit high brightness and excellent sharpness. In many scintillator panels, scintillator layers are composed of columnar crystal phosphors which are usually disposed on substrates such as supports. The columnar crystals constituting scintillator layers extend perpendicularly to the substrates such as supports, in order to be able to efficiently emit fluorescence produced therein in a direction perpendicular to the substrates such as supports. With this configuration, the scintillator panels ensure brightness and sharpness as well as achieve strength in the direction perpendicular to the substrates such as supports (hereinafter, this direction will be also referred to as the "film thickness direction").

Various studies and attempts have been made focusing on the shapes of phosphor crystals that form scintillator layers. For example, Patent Document 1 directed to obtaining a scintillator panel having high brightness and excellent sharpness discloses a radiographic conversion panel having on a substrate a phosphor layer which includes columnar crystals containing a phosphor base material and having a specific shape. The phosphor layer in the radiographic conversion panel of Patent Document 1 has a combination of a first phosphor layer with a specific film thickness including a phosphor base material and a second phosphor layer containing the phosphor base material and an activator. Patent Document 1 is based on the finding that excellent sharpness is obtained when the columnar phosphor crystals forming the phosphor layer satisfy a specific ratio of the crystal diameter at the outermost surface to the crystal diameter at 10 μm height from the substrate side.

CITATION LIST

Patent Literature

Patent Document 1: WO 2010/032503

Non Patent Literature

Non Patent Document 1: John Rowlands, "Amorphous Semiconductor Usher in Digital X-ray Imaging", Physics Today, November issue, 24 (1997)

Non Patent Document 2: L. E. Antonuk, "Development of a High Resolution Active Matrix Flat-Panel Imager with Enhanced Fill Factor", SPIE, 32, 2 (1997)

SUMMARY OF THE INVENTION

In addition to ensuring brightness and sharpness, radiographic image conversion panels should also be resistant to pressure applied in the film thickness direction.

With this point in mind, conventional radiographic image conversion panels are configured such that columnar phosphor crystals constituting a scintillator layer are connected to one another at their root portions. For example, FIG. 1B illustrates such a radiographic image conversion panel 90 having a structure in which columnar phosphor crystals 920 are disposed on a support 91. As illustrated, a scintillator layer 92 is configured such that the root portions of the respective columnar phosphor crystals 920 adjacent to the support 91 are connected to one another. However, such radiographic image conversion panels have a problem in that they remain insufficient in terms of the strength resisting pressure applied in the film thickness direction during use as scintillator panels. Patent Document 1 does not give considerations to the strength to resist pressure applied in the film thickness direction.

It is therefore an object of the invention to provide radiographic image conversion panels which realize high levels of brightness and sharpness when used as scintillator panels and which also ensure sufficient strength resisting pressure applied in the film thickness direction.

The present inventors have studied radiographic image panels or radiographic image detectors in which scintillator layers are disposed on supports or photoelectric conversion element panels. As a result, the present inventors have found that the devices can withstand pressure in the film thickness direction while ensuring high brightness and high sharpness by configuring the scintillator layer such that the scintillator layer is composed of a plurality of columnar crystals having independent root portions. The present invention has been completed based on the finding.

To achieve at least one of the above objects, a first aspect of the present invention resides in a radiographic image conversion panel including:

a support and a scintillator layer disposed on the support, the scintillator layer including a plurality of columnar crystals containing a phosphor, the plurality of columnar crystals having root portions, the root portions being spaced apart from one another.

Further, a second aspect of the invention resides in radiographic image detectors.

A first radiographic image detector of the invention includes the radiographic image conversion panel and a photoelectric conversion element panel.

A second radiographic image detector of the invention includes:

a photoelectric conversion element panel and a scintillator layer disposed on the photoelectric conversion element panel, the scintillator layer including a plurality of columnar crystals containing a phosphor, the plurality of columnar crystals having root portions, the root portions being spaced apart from one another.

Advantageous Effects of the Invention

According to the invention, radiographic image conversion panels and radiographic image detectors may be obtained which ensure high levels of brightness and sharpness and which also exhibit high durability to resist pressure applied in the film thickness direction.

DESCRIPTION OF THE PREFERRED EMBODIMENTS

Hereinbelow, radiographic image conversion panels and radiographic image detectors according to the present invention will be described in detail.

Herein, the term "light" indicates electromagnetic waves that are mainly visible light in the ultraviolet to infrared region, in more detail, electromagnetic waves having wavelengths of 300 nm to 800 nm. The term "phosphor" or "scintillator" indicates a fluorescent material that absorbs energy of incident radiations such as X-rays and emits the "light".

Further, the term "height" is used as a concept indicating positions in the film thickness direction.

[Radiographic Image Conversion Panels]

A radiographic image conversion panel according to the invention includes:

a support and a scintillator layer disposed on the support, the scintillator layer including a plurality of columnar crystals containing a phosphor, and the plurality of columnar crystals having root portions which are spaced apart from one another.

Figure 1B:
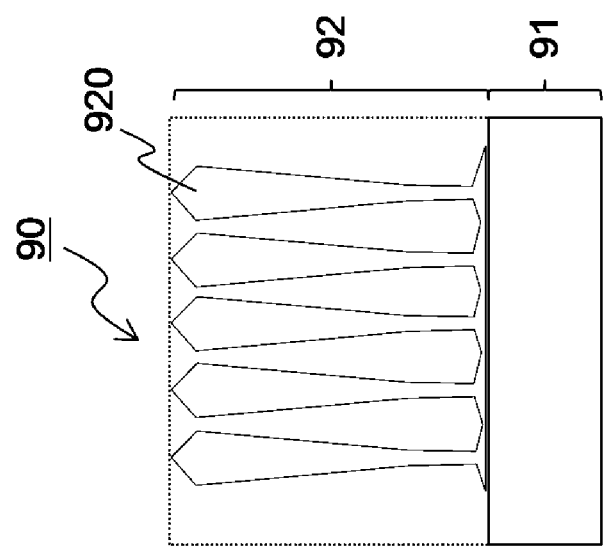
FIGS. 1A and 1B are schematic views illustrating basic configurations of an inventive radiographic image conversion panel and a conventional radiographic image conversion panel, respectively.
Figure 1A:
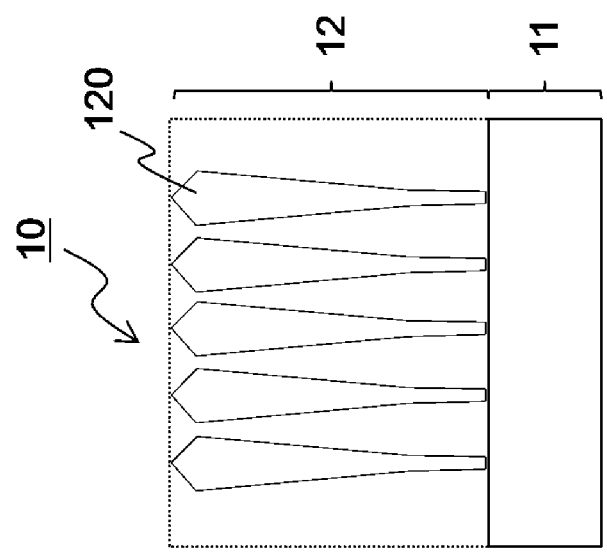

FIG. 1A illustrates a basic configuration of a radiographic image conversion panel of the invention. As illustrated in FIG. 1A, a radiographic image conversion panel 10 has a configuration in which a scintillator layer 12 is composed of a plurality of columnar crystals 120 containing a phosphor and the plurality of columnar crystals 120 have separate and independent root portions adjacent to a support 11.

Figure 2:
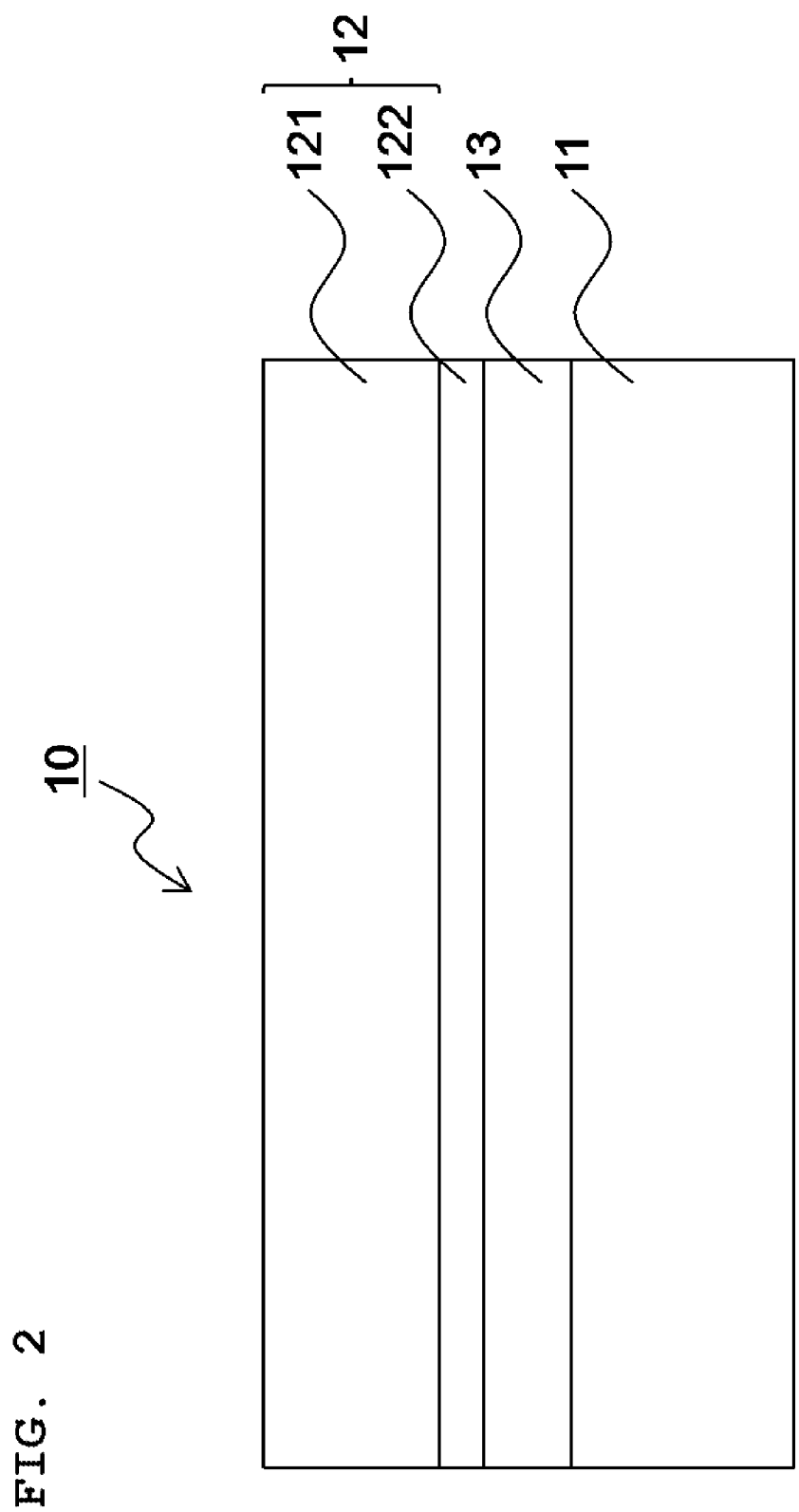
FIG. 2 is a schematic view illustrating an example of the inventive radiographic image conversion panels.
Figure 3:
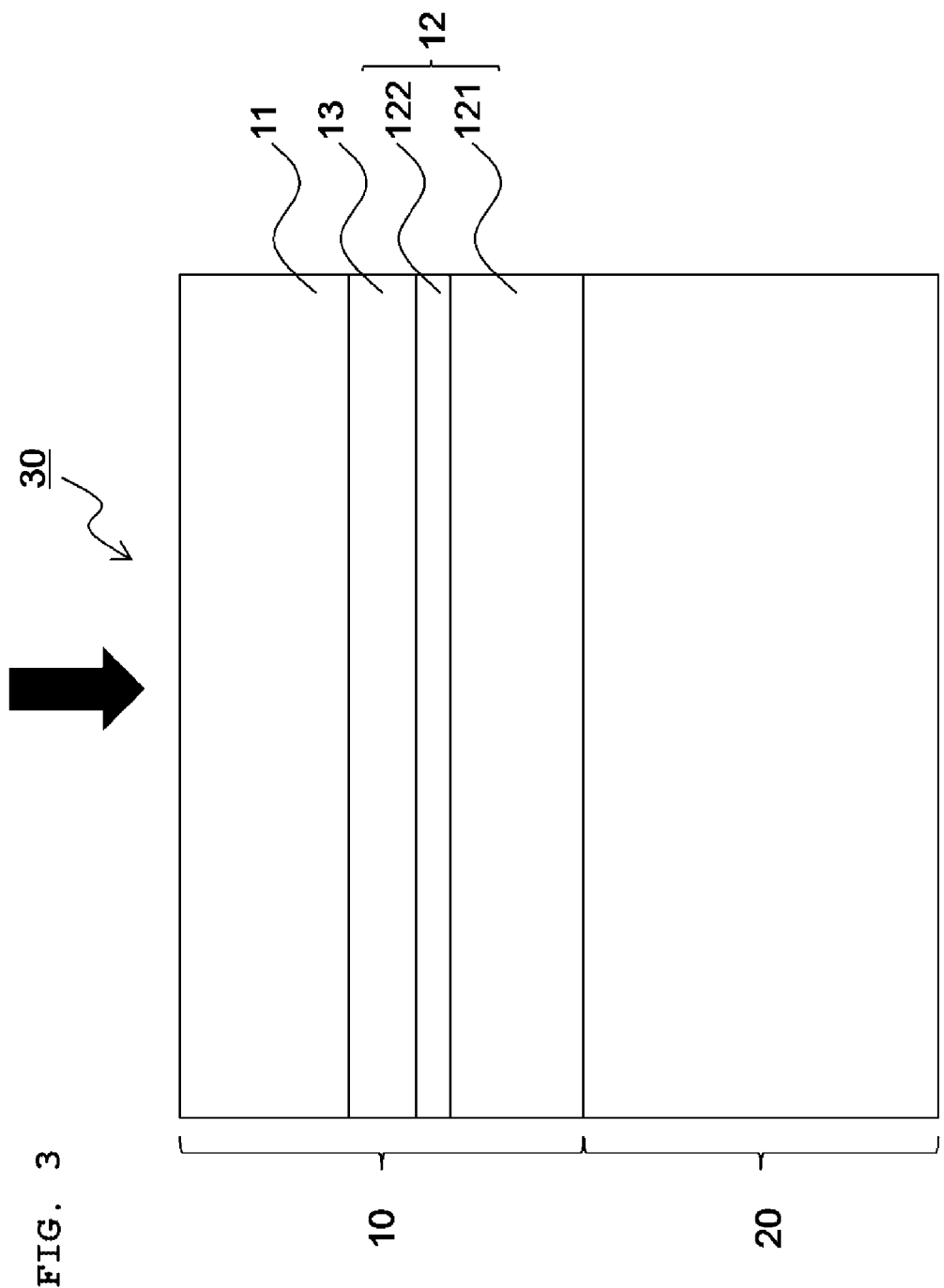
FIG. 3 is a schematic view illustrating an example of first radiographic image detectors having a combination of an inventive radiographic image conversion panel and a photoelectric conversion element panel.

In a more specific embodiment, as illustrated in FIG. 2, the radiographic image conversion panel 10 may further include an additional layer such as a reflective layer 13. Such a radiographic image conversion panel 10 may be used as a scintillator panel and, as illustrated in FIG. 3, the combined use thereof with a photoelectric conversion element panel 20 may produce a radiographic image detector 30 which can output image data in the form of electric signals. In the radiographic image conversion panel 10 illustrated in FIG. 2, the root portions of the plurality of columnar crystals 120 that constitute the scintillator layer 12 are indirectly in touch with the support 11 via a layer such as a reflective layer 13.

Hereinbelow, the structural components will be sequentially described.

Supports

In the radiographic image conversion panel 10 of the invention, the support 11 serves as a base on which the columnar crystals 120 for the scintillator layer 12 are formed as well as holds the structure of the scintillator layer 12.

The materials for the support 11 may be similar to materials used as supports in conventional scintillator panels. Examples include various glasses, ceramics, semiconductors, polymer materials and metals which are transmissive to radiations such as X-rays. Specific examples of such materials include plate glasses such as quartz, borosilicate glass and chemically reinforced glass; ceramics such as sapphire, silicon nitride and silicon carbide; semiconductors such as silicon, germanium, gallium arsenide, gallium phosphide and gallium nitride; polymer films (plastic films) such as cellulose acetate films, polyester resin films, polyethylene terephthalate films, polyamide films, polyimide films, triacetate films, polycarbonate films and carbon fiber-reinforced resin sheets; metal sheets such as aluminum sheets, iron sheets and copper sheets, as well as metal sheets having layers of oxides of the metals; and bio-nanofiber films. These materials may be used singly, or two or more may be stacked together.

Of the above materials for the support 11, flexible polymers having a thickness of 50 to 500 μm are particularly preferable. In particular, polyimides are preferable from the viewpoint of heat resistance during deposition.

Here, the term "flexible" means that the elastic modulus at 120° C. (E120) is 0.1 to 300 GPa.

Here, the "elastic modulus" is a value obtained by testing a JIS-C2318 sample with a tensile tester, and calculating the ratio of the stress over the strain indicated by the gauge marks on the sample, in the range in which the strain stress curve shows a straight relationship. This ratio is called the Young's modulus. In the specification, this Young's modulus is defined as the elastic modulus.

The support 11 preferably has an elastic modulus at 120° C. (E120) of 0.1 to 300 GPa, and more preferably 1 to 100 GPa.

Specific examples of the flexible polymer films include polyethylene naphthalates (7 GPa), polyethylene terephthalates (4 GPa), polycarbonates (2 GPa), polyimides (7 GPa), polyetherimides (3 GPa), aramids (12 GPa), polysulfones (2 GPa) and polyether sulfones (2 GPa). (The numbers in parenthesis indicate elastic moduli.) The values of elastic modulus are variable even in polymer films of the same material, and the values in parenthesis are not absolutely correct and should be considered as a guide. The above polymer materials are advantageous in that the materials have high heat resistance and can withstand deposition of phosphor. In particular, polyimides possess especially high heat resistance and are suitable in the case where the columnar crystals of phosphor (scintillator) are formed by a gas-phase method using CsI (cesium iodide) as the raw material.

The flexible polymer film may be a single polymer film, a film of a mixture of the above polymers, or a stack of two or more identical or different polymer layers.

The use of a bio-nanofiber film as the support 11 provides benefits in terms of support characteristics and environmental friendliness because the bio-nanofiber films have characteristics which are not possessed by existing glasses or plastics such as (i) low weight, (ii) strength five times or more greater than iron (high strength), (iii) resistance to swelling by heat (low thermal expansion properties), (iv) being flexible (excellent flexibility), (v) feasibility of various treatments such as mixing, coating and film production, and (vi) combustibility of plant fiber materials.

In order to, for example, adjust the reflectance of the support 11, the support 11 may include a light-shielding layer and/or a light-absorbing pigment layer in addition to the layer of the aforementioned material. Further, the support 11 may be one imparted with light-absorbing properties or light-reflecting properties or may be a colored support for the purpose of, for example, adjusting the reflectance.

The light-shielding layer and the pigment layer may be provided as separate films. This configuration will be described later in the section of "Additional layers".

Examples of the supports having light-shielding properties or light-reflecting properties include various metal plates and amorphous carbon plates. When the metal plates are used as the supports, aluminum plates having a thickness of not less than 0.2 mm and not more than 2.0 mm are preferable from the viewpoints of X-ray transmission properties and handling properties.

Examples of the colored supports include films containing coloring materials such as pigments, and supports having a reflective layer formed thereon by dispersing a coloring material such as a pigment in a binder resin. The use of such colored supports is preferable from the viewpoint of the adjustment of reflectance of the supports or deposition substrates.

That is, an embodiment of the "colored supports" is represented by a film including the aforementioned film material and a coloring material. In this case, the film itself defines the support 11. Here, examples of the "films including the aforementioned film material and a coloring material" include the aforementioned polymer films containing coloring materials such as pigments.

Another embodiment of the "colored supports" is represented by a stack including a layer of the aforementioned film material and, disposed on a surface of the layer, a reflective layer in which a coloring material is dispersed in a binder resin. In this case, the stack defines the support 11.

In the present invention, the coloring materials added in these films and reflective layers are more preferably pigments, and particularly preferably white pigments.

Examples of the pigments include white pigments such as alumina, yttrium oxide, zirconium oxide, titanium dioxide, barium sulfate, silica, zinc oxide and calcium carbonate; insoluble azo pigments such as First Yellow, Disazo Yellow, Pyrazolone Orange, Lake Red 4R and Naphthol Red; condensed azo pigments such as Cromophtal Yellow and Cromophtal Red; azo lake pigments such as Lithol Red, Lake Red C, Watching Red, Brilliant Carmine 6B and Bordeaux 10B; nitroso pigments such as Naphthol Green B; nitro pigments such as Naphthol Yellow S; phthalocyanine pigments such as Phthalocyanine Blue, First Sky Blue and Phthalocyanine Green; threne pigments such as Anthrapyrimidine Yellow, Perinone Orange, Perylene Red, Thioindigo Red and Indanthrone Blue; quinacridone pigments such as Quinacridone Red and Quinacridone Violet; dioxadine pigments such as Dioxadine Violet; isoindolinone pigments such as Isoindolinone Yellow; acidic dye lakes such as Peacock Blue Lake and Alkali Blue Lake; and basic dye lakes such as Rhodamine Lake, Methyl Violet Lake and Malachite Green Lake.

The binder resins are not particularly limited as long as the object of the invention is achieved. The binder resins may be purchased in the market or may be produced appropriately. Specific examples include polyurethanes, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesins, acrylic resins and urea formamide resins. Of these, hydrophobic resins such as polyester resins and polyurethane resins are preferable because of excellent interlayer adherability with respect to the columnar phosphor crystals formed by deposition and to the support. The resins may be used singly, or two or more may be used in combination. In particular, controlling of film properties is advantageously facilitated by combined use of two or more resins having a difference in glass transition temperature (Tg) of not less than 5° C. Such two or more resins used in combination may be of the same kind or different kinds as long as their glass transition temperatures are different.

The pigments are preferably used in amounts of 0.01 to 10 parts by weight with respect to 100 parts by weight of the binder resin. This amount of the pigments ensures sufficient coloring of the films and prevents deteriorations in mechanical properties such as elongation and strength of the support resin due to excessive addition of the pigments over the saturated coloration. In order for the deposition substrates (the supports) and scintillator panels produced therewith to achieve excellent cuttability as well as from the viewpoint of the adhesion with respect to a light-receiving element used in combination with the scintillator panel to form a radiographic imaging system, the thickness of the reflective layer is usually 5 to 300 μm, preferably 15 to 150 μm, and more preferably 30 to 100 μm.

Scintillator Layers

In the radiographic image conversion panel 10 of the invention, the scintillator layer 12 serves to convert the energy of incident radiations such as X-rays into light such as visible light.

In the radiographic image conversion panel 10 of the invention, the scintillator layer 12 includes a plurality of columnar crystals 120 containing a phosphor, and the plurality of columnar crystals 120 have root portions which are spaced apart from one another. The root portions of the plurality of columnar crystals 120 that constitute the scintillator layer 12 are usually directly or indirectly in touch with the support 11. For example, in the radiographic image conversion panel 10 illustrated in FIG. 1A, the root portions of the plurality of columnar crystals 120 that constitute the scintillator layer 12 are directly in touch with the support 11. However, the radiographic image conversion panel 10 according to the invention may include an appropriate additional layer such as a reflective layer 13 between the support 11 and the scintillator layer 12. For example, the radiographic image conversion panel 10 illustrated in FIG. 2 includes a reflective layer 13 between the support 11 and the scintillator layer 12. In this case, the root portions of the plurality of columnar crystals 120 that constitute the scintillator layer 12 are indirectly in touch with the support 11 via the reflective layer 13. Layers that may be interposed between the support 11 and the scintillator layer 12 will be illustrated specifically in the "Additional layers" below.

In the inventive radiographic image conversion panel 10, the "root portions" are portions in the scintillator layer 12 which are found in the vicinity of the support 11. In detail, the root portions extend from the surface on the support 11 side, namely, the ends of crystals in the scintillator layer 12 on the support 11 side to a height of 3 μm.

Phosphor Materials

The phosphor materials for the scintillator layer 12 are not particularly limited as long as the materials are capable of efficient conversion of the energy of incident radiations such as X-rays into light as well as can form columnar crystals. As long as these conditions are satisfied, any of various known phosphors may be used as the phosphor materials. In particular, suitable materials include cesium iodide (CsI), gadolinium oxysulfide (GOS), cadmium tungstate (CWO), gadolinium silicate (GSO), bismuth germanate (BGO), lutetium silicate (LSO) and lead tungstate (PWO). The phosphor materials used in the invention are not limited to phosphors of instantaneous emission such as CsI, and stimulable phosphors such as cesium bromide (CsBr) may be used in accordance with the application of radiographic image conversion panels.

Of the phosphor materials used in the invention, CsI is preferable because this phosphor material has relatively high X-ray energy to visible light conversion efficiency and also because cesium iodide is easily deposited to form columnar crystals and provides light guide effects ascribed to the crystal structure to suppress the scattering of light in the crystals and to allow the thickness of the scintillator layer 12 to be increased corresponding to the amount of suppressed scattering.

Cesium iodide alone as the phosphor material often fails to realize sufficient luminous efficiency. Although this fact does not eliminate the use of CsI alone as the phosphor material, it is preferable that the scintillator layer 12 include CsI as the phosphor base material in combination with any of various activators. Examples of such scintillator layers include a scintillator layer disclosed in JP-B-S54-35060 which contains CsI and sodium iodide (NaI) in an appropriate molar ratio. Further, an example of preferred scintillator layers is one disclosed in JP-A-2001-59899 which contains CsI and activators such as thallium (Tl), europium (Eu), indium (In), lithium (Li), potassium (K), rubidium (Rb) and sodium (Na) in an appropriate molar ratio.

In the scintillator panel of the invention, a particularly preferred scintillator layer includes cesium iodide and an activator(s) including one or more thallium compounds as the raw materials. In particular, thallium-activated cesium iodide (CsI:Tl) is preferable because this material has a wide emission wavelength range from 300 nm to 750 nm.

Various thallium compounds (thallium (I) compounds and thallium (III) compounds) may be used, with examples including thallium iodide (TlI), thallium bromide (TlBr), thallium chloride (TlCl) and thallium fluoride (TlF and $TlF_3$). In particular, thallium iodide (TlI) is preferable because of excellent activation of CsI.

The thallium compounds preferably have a melting point in the range of 400 to 700° C. This melting point of the thallium compounds ensures that the activator is uniformly distributed in the columnar crystals 120 in the scintillator layer 12 formed by deposition, resulting in an improvement in luminous efficiency. Herein, the melting point is measured at normal pressure (usually about 0.101 MPa).

In the scintillator layer 12 in the scintillator panel of the invention, the relative content of the activators in the scintillator layer 12 is preferably 0.1 to 5 mol %.

Herein, the relative content of the activators is the molar percentage of the activators relative to 1 mole of the phosphor base material taken as 100 mol %.

The term "phosphor base material" refers to the phosphor itself such as CsI that is not activated with activators. The raw materials for the scintillator layers such as the phosphor base materials and the activators are collectively referred to as phosphor raw materials.

From viewpoints such as the luminous efficiency of the scintillator layer, the degree of orientation based on an X-ray diffraction spectrum with respect to a plane of the phosphor in the scintillator layer 12 having a certain plane index is preferably in the range of 80 to 100% at any position in the direction of layer thickness. For example, the plane index in the columnar crystals of thallium-activated cesium iodide (CsI:Tl) may be any of indices including (100), (110), (111), (200), (211), (220) and (311), and is preferably (200). (For the plane indices, refer to X-Sen Kaiseki Nyuumon (Introduction to X-ray analysis) (Tokyo Kagaku Dojin), pp. 42-46.)

Herein, the "degree of orientation based on an X-ray diffraction spectrum with respect to a plane having a certain plane index" indicates the proportion of the intensity Ix of the certain plane index relative to the total intensity I of the total including planes with other plane indices. For example, the degree of orientation of the intensity I200 of the (200) plane in an X-ray diffraction spectrum is obtained by: "Degree of orientation=I200/I".

For example, the plane indices for the determination of the orientation degree may be measured by X-ray diffractometry (XRD) (crystal X-ray diffractometry or powder X-ray diffractometry). The X-ray diffractometry is a versatile analytical technique capable of identifying substances or obtaining information about structures such as crystal phase structures by utilizing a phenomenon in which a characteristic X-ray having a specific wavelength is diffracted by crystalline substances according to the Bragg's equation. The illumination targets may be Cu, Fe and Co, and the illumination outputs are generally about 0 to 50 mA and about 0 to 50 kV in accordance with the performance of the apparatus.

Layer Configurations

In the invention, the scintillator layer 12 may be a single layer or may include two or more layers. That is, the scintillator layer 12 may be composed of a phosphor layer 121 alone or may be a stack of an underlayer 122 and a phosphor layer 121 which are disposed in this order on the support 11. When the scintillator layer 12 includes an underlayer 122 and a phosphor layer 121, these two layers may include the same or different materials as long as the phosphor base materials are identical. That is, the scintillator layer 12 may be a single layer entirely composed of a phosphor base material alone or a single layer entirely composed of a phosphor base material and an activator, or may be a combination of an underlayer 122 composed of a phosphor base material alone and a phosphor layer 121 including the phosphor base material and an activator, or may be a combination of an underlayer 122 including a phosphor base material and a first activator and a phosphor layer 121 including the phosphor base material and a second activator.

In the invention, the scintillator layer 12 may be preferably composed of a phosphor layer 121 including a phosphor base material and an activator, or may preferably include a phosphor layer 121 including a phosphor base material and an activator, and an underlayer 122 including the phosphor base material and an activator. Particularly preferably, the scintillator layer 12 includes a phosphor layer 121 including a phosphor base material and an activator, and an underlayer 122 including the phosphor base material and an activator.

In the underlayer 122, the relative content of the activator is preferably 0.01 to 1 mol %, and more preferably 0.1 to 0.7 mol %. In particular, the relative content of the activator in the underlayer 122 is highly preferably not less than 0.01 mol % in terms of the enhancement of emission brightness as well as the storage properties of the scintillator panels. Further, it is highly preferable that the relative content of the activator in the underlayer 122 be lower than the relative content of the activator in the phosphor layer 121. The molar ratio of the relative content of the activator in the underlayer 122 to the relative content of the activator in the phosphor layer 121 ((relative content of activator in underlayer)/(relative content of activator in phosphor layer)) is preferably 0.1 to 0.7.

When the scintillator layer 12 has no underlayer 122, the relative content of the activator in the root portions is preferably similar to the relative content of the activator in the underlayer 122. In this case, it is highly preferable that the relative content of the activator in the root portions be lower than the relative content of the activator in the other upper portions of the phosphor layer 121. The same applies to the molar ratio of the relative content of the activator in the root portions to the relative content of the activator in the other upper portions of the phosphor layer 121. Specifically, the ratio ((relative content of activator in root portions)/(relative content of activator in other upper portions of phosphor layer)) is preferably similar to the ratio of the relative content of the activator in the underlayer 122 to the relative content of the activator in the phosphor layer 121.

In the invention, the coefficient of variation in the activator component concentration (for example, the Tl concentration) in the plane of the phosphor layer 121 is preferably not more than 40%, more preferably not more than 30%, still more preferably not more than 20%, and particularly preferably not more than 10%.

In the radiographic image conversion panel 10 of the invention, the thickness of the scintillator layer 12 is preferably 100 to 1000 µm, more preferably 100 to 800 µm, and still more preferably 120 to 700 µm because this film thickness ensures that a good balance is obtained between the brightness of the scintillator panel and the sharpness of the obtainable radiographic images.

The thickness of the underlayer 122 which may be present as a constituent of the scintillator layer 12 is preferably 0.1 µm to 50 µm, more preferably 3 µm to 50 µm, and still more preferably 5 µm to 40 µm from the viewpoints of high brightness of the scintillator panel and ensuring the sharpness of the obtainable radiographic images.

Shapes of Columnar Crystals Constituting Scintillator Layer 12

The shape of the columnar crystals 120 constituting the scintillator layer 12 may be evaluated based on sectional areas in a direction perpendicular to the support 11, namely, sectional areas at various heights in the film thickness direction. However, because the columnar crystals 120 may be variable in sectional area from one another, the shape of the columnar crystals 120 is preferably evaluated based on the void content in order to minimally reduce the influence of sectional area variations among the columnar crystals 120.

Herein, the void content refers to the ratio of the total sectional area of voids to the sum of the total sectional area of the columnar phosphor crystals plus the total sectional area of the voids with respect to cross sections of the scintillator layer parallel to the plane of the support.

The void content may be determined by cutting the phosphor layer 121 and/or, where appropriate, the underlayer 122 of the scintillator panel at a certain thickness parallel to the plane of the support 11, and calculating the areas of the phosphor portions and of the voids in the scanning electron micrograph of the cross section. For example, the areas of the phosphor portions and of the voids may be obtained by digitizing the scanning electron micrograph of the cross section with use of an image processing software into the phosphor portions and the voids to obtain the number of pixels Nf for the phosphor portions and the number of pixels Nv for the voids. The void content may then be calculated according to Nv/(Nf+Nv).

The coefficient of variation in the crystal diameters of the columnar crystals 120 is preferably not more than 50%, more preferably not more than 20%, and particularly preferably not more than 10%. The unevenness in sensitivity may be reduced and high-quality radiographic images may be obtained by aligning the thickness of the phosphor layer such that the thickness distribution in the phosphor layer will be not more than ±20%. The coefficient of variation in the void contents of the columnar crystals 120 is preferably not more than 50%, more preferably not more than 20%, and particularly preferably not more than 10%.

In the radiographic image conversion panel 10 of the invention, the phosphor that constitutes the scintillator layer 12 is in the form of columnar phosphor crystals described above. In the invention, it is necessary that the plurality of columnar crystals constituting the scintillator layer 12 be present in such a configuration that their root portions adjacent to the support 11 are independent from one another. Specifically, the inventive radiographic image conversion panel 10 is configured such that the root portions of the plurality of columnar crystals constituting the scintillator layer 12 are spaced apart from one another without being connected together. This configuration of columnar crystals ensures that a pressing load applied to the columnar crystals in the film thickness direction will be dispersed and the columnar crystals will be less deformed, thereby enhancing the durability of the radiographic image conversion panels 10.

In the invention, the scintillator layer 12 preferably has a lower void content in the root portions than at any heights in the other upper portions. By allowing the void content to have a gradient in the direction of thickness of the scintillator layer, impact resistance and brightness may be enhanced while maintaining sharpness.

In more detail, it is preferable that the crystal diameters of the columnar crystals 120 constituting the scintillator layer 12 satisfy the relationship $1 \leq (b/a) \leq 3$, and more preferably $1 \leq (b/a) \leq 2$ wherein the letter a is the average crystal diameter of the columnar crystals at a height of 1 μm, and the letter b is the average crystal diameter of the columnar crystals at a height of 3 μm, both heights being values from the side adjacent to the support 11. When the value of (b/a) is 3 or less, the columnar crystals are prevented from deformation due to excessive local stress concentration when a pressure is applied in the direction of thickness of the radiographic image conversion panel, and thus the strength of the scintillator layer is advantageously ensured. On the other hand, controlling the (b/a) ratio to 1 or more is generally easy in production steps.

From the viewpoint of the strength against a pressure in the direction of thickness of the radiographic image conversion panel, it is more preferable that the (b/a) ratio be in the above range and the average crystal diameter b be not more than 3 μm. When this condition is met, some strength may be obtained even when the scintillator layer 12 has no underlayer 122. However, the addition of an underlayer 122 to a phosphor layer 121 ensures an excellent total balance among strength, sharpness and brightness.

To ensure sharpness, it is preferable that the columnar crystals 120 constituting the scintillator layer 12 have an average crystal diameter c of not more than 10 μm, and more preferably not more than 8 μm as measured with respect to an uppermost portion of the scintillator layer.

In the invention, the term "average crystal diameter" specifically indicates an average circular equivalent diameter. This "average circular equivalent diameter" is measured by a process in which the columnar crystal scintillator layer is coated with a conductive substance (such as platinum palladium alloy, gold or carbon) and analyzed with a scanning electron microscope (SEM) (S-800 manufactured by Hitachi, Ltd.) to determine circular equivalent diameters which are the diameters of circles circumscribed around the cross sections of respective columnar crystals, and the thus-obtained circular equivalent diameters of thirty columnar crystals are averaged.

The average crystal diameter a of the columnar crystals at a height of 1 μm, and the average crystal diameter b of the columnar crystals at a height of 3 μm are each an average of circular equivalent crystal diameters obtained by the observation of crystal faces exposed by filling the crystals with an appropriate resin such as an epoxy resin and polishing the surface of the crystal film until the thickness from the support side becomes 1 μm and 3 μm, respectively.

The average crystal diameter c of the columnar crystals at an uppermost portion of the scintillator layer 12 is an average of circular equivalent crystal diameters obtained by the observation of crystal faces exposed by grinding the columnar crystals by 10 μm from the side opposite to the support side.

When X-rays are incident from the lower side of CsI, the consequent fluorescent light is effectively propagated toward the ends of CsI crystals by virtue of the light guide effects of CsI. The light that has reached the crystal ends is then emitted to the outside of the crystals. In this process, total reflection occurs in the crystals depending on the directions of the light that has reached the crystal ends, and consequently the amount of light emitted from the crystal ends is decreased. That is, the luminous efficiency is significantly changed by controlling the angles of ends of columnar crystals. From this aspect, the angles of ends of CsI columnar crystals are preferably 40 to 80° in order to improve luminous efficiency.

In the case where a moistureproof protective layer is provided on the phosphor, it is difficult for the columnar phosphor crystals to penetrate into such an external protective layer at high temperature and high humidity. As a result, the diffusion of light from the columnar phosphor crystals to the external protective layer is restrained. From this viewpoint, end portions of the columnar phosphor crystals preferably have (a) outwardly curved surfaces, (b) flat surfaces, or (c) 90° or greater angles (obtuse angles) to ensure close contact with external protective layers.

The crystals have larger diameters on the fluorescence emitting side and smaller diameters on the support side. Due to this configuration, the packing density of the phosphor crystals in the columns is higher on the fluorescence emitting side than on the support side. That is, the gaps are relatively larger on the support side. Further, a porous structure is often formed on the side of each columnar crystal. When the porous structure is composed of small pores with a diameter of 1 μm or less, the pore density is preferably less than 100,000 pores/$mm^2$. The presence of 100,000 or more pores per $mm^2$ may adversely affect optical characteristics of radiographic images such as lower sharpness.

Additional Layers

As illustrated in FIG. 2, the radiographic image conversion panel 10 of the invention may further include a reflective layer 13 as well as a protective layer and a moistureproof protective layer which are not shown in addition to the support 11 and the scintillator layer 12, similarly to known scintillator panels.

Reflective Layers

The radiographic image conversion panel 10 of the invention may be used as a scintillator panel. In this case, as illustrated in FIG. 3, a photoelectric conversion element panel 20 is coupled to the surface on the scintillator layer 12 side, thereby forming a radiographic image detector 30.

Thus, it is preferable that the radiographic image conversion panel 10 further include a reflective layer 13 between the support 11 and the scintillator layer 12 to allow the fluorescence produced in the scintillator layer 12 to be effectively directed to the photoelectric conversion element panel 20. Here, the reflective layer 13 is a layer capable of reflecting the portion of fluorescence produced in the scintillator layer 12, specifically the phosphor layer 121, that propagates in a direction toward the support 11.

In the invention, the reflective layer 13 may be made of any materials used in conventional scintillator plates, and may be preferably formed using a metal having high reflectance. Examples of the high-reflectance metal films include materials including substances selected from the group consisting of Al, Ag, Cr, Cu, Ni, Mg, Pt and Au. The metals preferably have an electric conductivity of not less than 6.0 S/m (Siemens per meter), and more preferably not less than 30 S/m. From the viewpoints of reflectance and electrical conductivity, Al (40 S/m), Ag (67 S/m) and Au (46 S/m) are preferred. The reflective layer 13 may be composed of light-reflecting particles such as titanium dioxide, and an appropriate binder resin.

The reflective layer 13 may include a single layer, or two or more layers.

The reflective layer 13 may be directly attached onto the substrate by vacuum deposition, sputtering deposition or plating. From the viewpoint of productivity, sputtering deposition is preferred. The film thickness may vary depending on the film production method. The film thickness is preferably 50 nm to 400 nm in the case of vacuum deposition, and 20 nm to 200 nm in the case of sputtering deposition.

Protective Layers

To prevent problems such as corrosion of the reflective layer 13 by the phosphor, a protective layer may be disposed between the reflective layer 13 and the scintillator layer 12.

The protective layer is preferably formed by the application and drying of a solution of a resin in a solvent. From the viewpoint of the interlayer adherability with respect to the deposited crystals and to the reflective layer 13, the resins are preferably polymers having a glass transition temperature of 30 to 100° C.

Specific examples of the resins include polyurethane resins, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesins, acrylic resins and urea formamide resins, with polyester resins being preferable. The resins may be used singly, or two or more may be used in combination. In particular, controlling of film properties is advantageously facilitated by combined use of two or more resins having a difference in glass transition temperature (Tg) of not less than 5° C. In this case, the two or more resins used in combination may be of the same kind or different kinds as long as their glass transition temperatures are different.

The thickness of the protective layer is preferably not less than 0.1 μm in terms of adhesion, and is preferably not more than 3.0 μm in order to ensure smoothness of the surface of the protective layer. The thickness of the protective layer is more preferably from 0.2 to 2.5 μm.

Examples of the solvents used in the formation of the protective layers include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; aromatic compounds such as toluene, benzene and xylene; esters of lower fatty acids with lower alcohols such as methyl acetate, ethyl acetate and butyl acetate; ethers such as dioxane, ethylene glycol monoethyl ether and ethylene glycol monomethyl ether; cyclohexane, and cyclohexanone; and mixtures of these solvents.

Moistureproof Protective Layers

Preferably, the radiographic image conversion panel 10 of the invention further includes a moistureproof protective layer covering the outer periphery of the panel. The moistureproof protective layer serves to prevent the entirety of the panel from an entry of moisture and to suppress the degradation of the scintillator layer 12.

Examples of the moistureproof protective layers include protective films having low moisture permeability and moistureproof films such as polyparaxylylene films.

For example, the protective films may be polyethylene terephthalate (PET) films. Examples of the protective films other than PET films include polyester films, polymethacrylate films, nitrocellulose films, cellulose acetate films, polypropylene films and polyethylene naphthalate films. In accordance with the required moisture proofness, substances such as metal oxides may be deposited onto these films and a plurality of such deposition-coated films may be stacked on top of one another.

In the radiographic image conversion panel 10, a heat fusible resin is preferably disposed on the opposite surfaces on the support 11 side and on the scintillator layer 12 side to seal these surfaces by fusion bonding. The heat fusible layers may be any of common resin films which are fusion-sealable with an impulse sealer. Examples include, but are not limited to, ethylene vinyl acetate copolymer (EVA) films, polypropylene (PP) films and polyethylene (PE) films.

To seal the radiographic image conversion panel, the radiographic image conversion panel may be interposed between upper and lower protective films and the end regions of the upper and lower protective films in contact with each other may be fusion bonded together in a vacuum environment.

The thickness of the protective films is preferably 10 to 100 μm.

The protective films are imparted with moisture proofness. In detail, the moisture permeability (or moisture vapor transmission rate) of the protective films is preferably not more than $50 \text{ g/m}^2 \cdot \text{day}$, more preferably not more than $10 \text{ g/m}^2 \cdot \text{day}$, and particularly preferably not more than $1 \text{ g/m}^2 \cdot \text{day}$. The moisture permeability of the protective films may be measured with reference to the method specified in JIS Z 0208.

Specifically, the moisture permeability may be measured by the following method. A space is partitioned with the protective film at 40° C., and one side is maintained at 90% relative humidity (RH) and the other side in a dry state using a hygroscopic agent. The mass (g) of vapor passed through the protective film (per 1 m² of the protective film) in 24 hours is defined as the moisture permeability of the protective film.

In order to obtain or control the moisture permeability of the protective films in the above range and thereby to enhance moisture proofness, it is preferable to use deposition-coated polyethylene terephthalate films or polyethylene terephthalate films having a thin film of aluminum oxide deposited thereon.

The optical transmittance of the protective films is represented as a value relative to the optical transmittance of air taken as 100%. The optical transmittance may be obtained according to the following equation:

$$\text{Optical transmittance}(\%) = (\text{transmitted light/incident light}) \times 100$$

The moistureproof protective layers may be moistureproof films such as polyparaxylylene films. The support having the phosphor layer may be placed in a deposition chamber of a CVD apparatus, and may be exposed to vapor produced by sublimation of diparaxylylene in the deposition chamber. In this manner, a polyparaxylylene film may be deposited onto the entirety of the surface of the scintillator layer 12 and the support 11 of the radiographic image conversion panel 10.

Light-Shielding Layers

The light-shielding layers include materials having light-shielding properties. The light-shielding layer may be contained in the support 11, as mentioned above, or may be separate from the support 11. When the radiographic image conversion panel 10 of the invention has the reflective layer 13, the light-shielding layer is preferably placed on the surface of the reflective layer 13 opposite to the scintillator layer 12.

From the viewpoint of adjusting the reflectance of the support, preferred light-shielding materials for the light-shielding layers are metal materials including one, or two or more of aluminum, silver, platinum, palladium, gold, copper, iron, nickel, chromium, cobalt and stainless steel. In particular, aluminum- or silver-based metal materials are particularly preferable because such light-shielding layers exhibit excellent light-shielding properties and corrosion resistance. The light-shielding layer may be composed of a single film of the metal material, or may include two or more films of the metal materials.

In order to increase the adhesion between the support 11 and the light-shielding layer, an intermediate layer is preferably disposed between the support 11 and the light-shielding layer. Examples of the materials of the intermediate layer include general adhesive polymers (such as epoxy resins), as well as metals different from the metals in the light-shielding layers (dissimilar metals). Examples of the dissimilar metals include nickel, cobalt, chromium, palladium, titanium, zirconium, molybdenum and tungsten. The intermediate layer may include one, or two or more kinds of these dissimilar metals. In particular, it is preferable that nickel or chromium, or both of these metals be contained from the viewpoint of the light-shielding properties of the light-shielding layer. From the viewpoint of luminous efficiency, the thickness of the light-shielding layer is preferably 0.005 to 0.3 µm, and more preferably 0.01 to 0.2 µm.

The light-shielding layer made of such a metal material also serves as an antistatic layer and thus may be suitably used for antistatic purposes. Such an antistatic layer may be formed instead of or in combination with the addition of an antistatic agent to the reflective layer. In this case, to prevent static electricity on deposition substrates, the surface resistivity measured with respect to the surface of the reflective layer opposite to the surface adjacent to the support is preferably not more than $1.0 \times 10^{12} \Omega/\square$, more preferably not more than $1.0 \times 10^{11} \Omega/\square$, and most preferably not more than $1.0 \times 10^{10} \Omega/\square$.

The light-shielding layer may be provided on the support 11 by any methods without limitation such as deposition, sputtering and metal foil lamination. From the viewpoint of the adhesion of the light-shielding layer with the support, sputtering is most preferable.

Pigment Layers

The light-absorbing pigment layers are not particularly limited as long as the layers have light-absorbing properties and are pigmented. For example, layers including a pigment and a binder resin may be used. The light-absorbing pigment layer may be contained in the support 11, as mentioned above, or may be separate from the support 11. When the radiographic image conversion panel 10 of the invention has the reflective layer 13, the light-absorbing pigment layer is preferably placed on the surface of the reflective layer 13 opposite to the scintillator layer 12. When both of the light-absorbing pigment layer and the light-shielding layer are used, they are preferably disposed in the order of the light-shielding layer and the light-absorbing pigment layer from the support 11 side toward the scintillator layer 12.

The pigments in the pigment layers may be any known pigments. Suitable pigments are those capable of absorbing long-wavelength red light which is more prone to scatter, and blue pigments are preferred, with examples including ultramarine blue and Prussian blue (iron ferrocyanide). Further, organic blue pigments such as phthalocyanine, anthraquinone, indigoid and carbonium may also be used. Of these, phthalocyanine is preferable from viewpoints such as radiation durability and UV durability of the light-absorbing pigment layers.

Examples of the binder resins in the pigment layers include polyurethanes, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesins, acrylic resins and urea formamide resins. Of these, hydrophobic resins such as polyester resins and polyurethane resins are preferable because of excellent interlayer adherability with respect to the columnar phosphor crystals formed by deposition and to the support. The resins may be used singly, or two or more may be used in combination.

From the viewpoint of light-absorbing properties of the pigment layers, the pigments are preferably used in amounts of 0.01 to 10 parts by weight with respect to 100 parts by weight of the binder resin. This amount of the pigments ensures sufficient coloring of the films and prevents deteriorations in mechanical properties such as elongation and strength of the support resin due to excessive addition of the pigments over the saturated coloration.

From the viewpoint of cuttability, the thickness of the pigment layer is preferably 1 to 500 µm.

Methods for Manufacturing Radiographic Image Conversion Panels

The radiographic image conversion panels 10 of the invention may be manufactured by any methods without limitation as long as the object of the invention is not impaired. Basically, the inventive radiographic image conversion panels may be manufactured by any of known scintillator panel manufacturing methods except that the scintillator layer 12 is produced by forming columnar phosphor crystals such that the root portions of the columnar crystals are spaced apart from one another.

In detail, the radiographic image conversion panel 10 of the invention may be obtained by optionally forming layers such as a reflective layer 13 and a protective layer on a substrate as a support 11 according to known techniques, and thereafter forming a scintillator layer 12, and optionally further forming a moistureproof protective layer as required by a known method. Here, the reflective layer 13, the protective layer and the moistureproof protective layer may be formed by the methods described in the sub-sections of "Reflective layers", "Protective layers" and "Moistureproof protective layers" in the section of "Additional layers".

The formation of the scintillator layer 12 is not limited to any particular methods as long as a phosphor that will constitute the scintillator layer 12 may form columnar crystals and the root portions of the columnar crystals are spaced apart from one another. In the invention, however, the scintillator layer 12 is preferably formed by a gas-phase method, specifically by a deposition method. The same applies to the formation of a scintillator layer 12' in a second radiographic image detector 40 described later.

Figure 6:
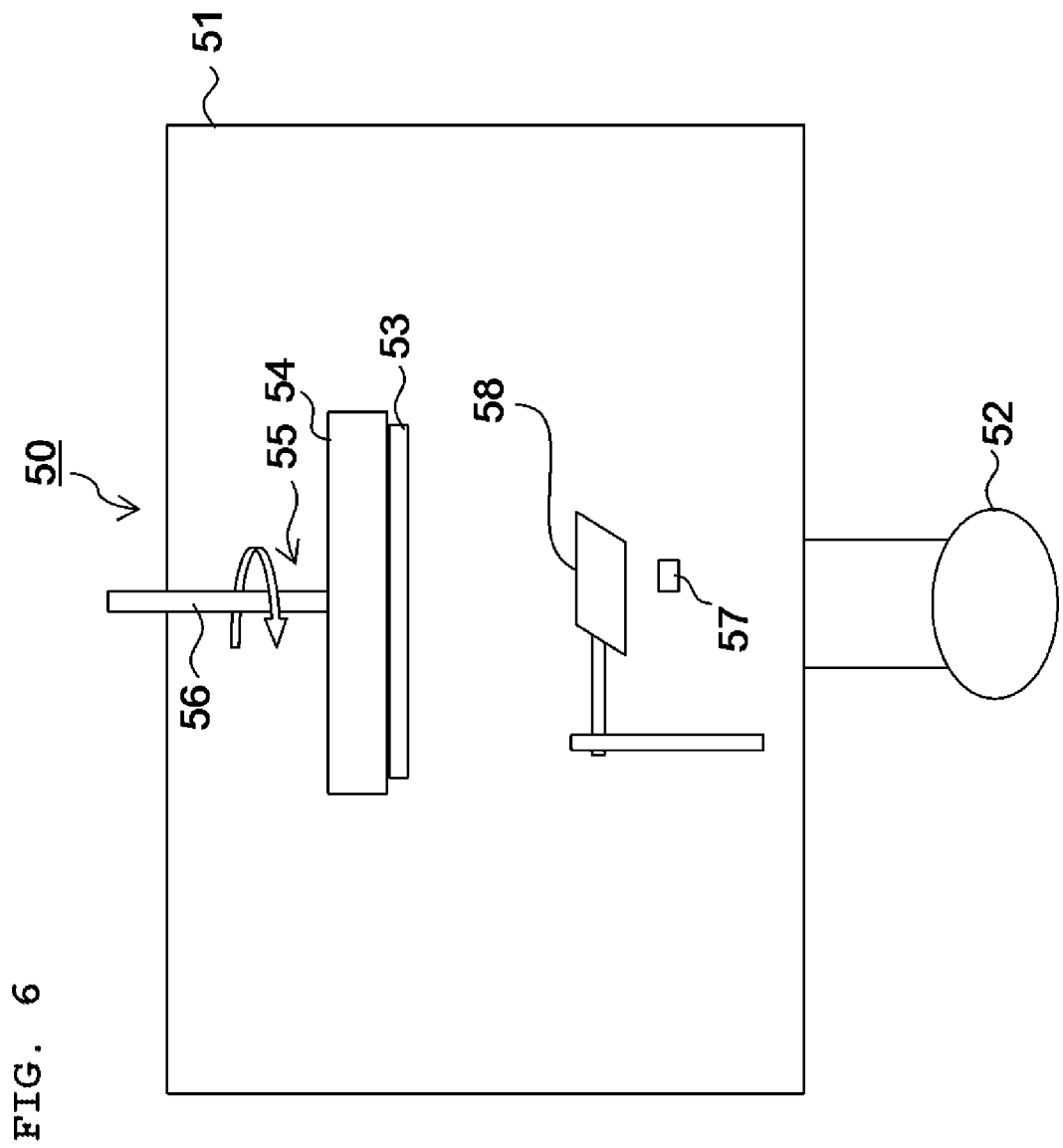
FIG. 6 is a schematic view illustrating a configuration of an exemplary deposition apparatus used in the invention.

While the apparatuses used in the deposition methods are not particularly limited, for example, a deposition apparatus illustrated in FIG. 6 is preferably used.

Figure 7:
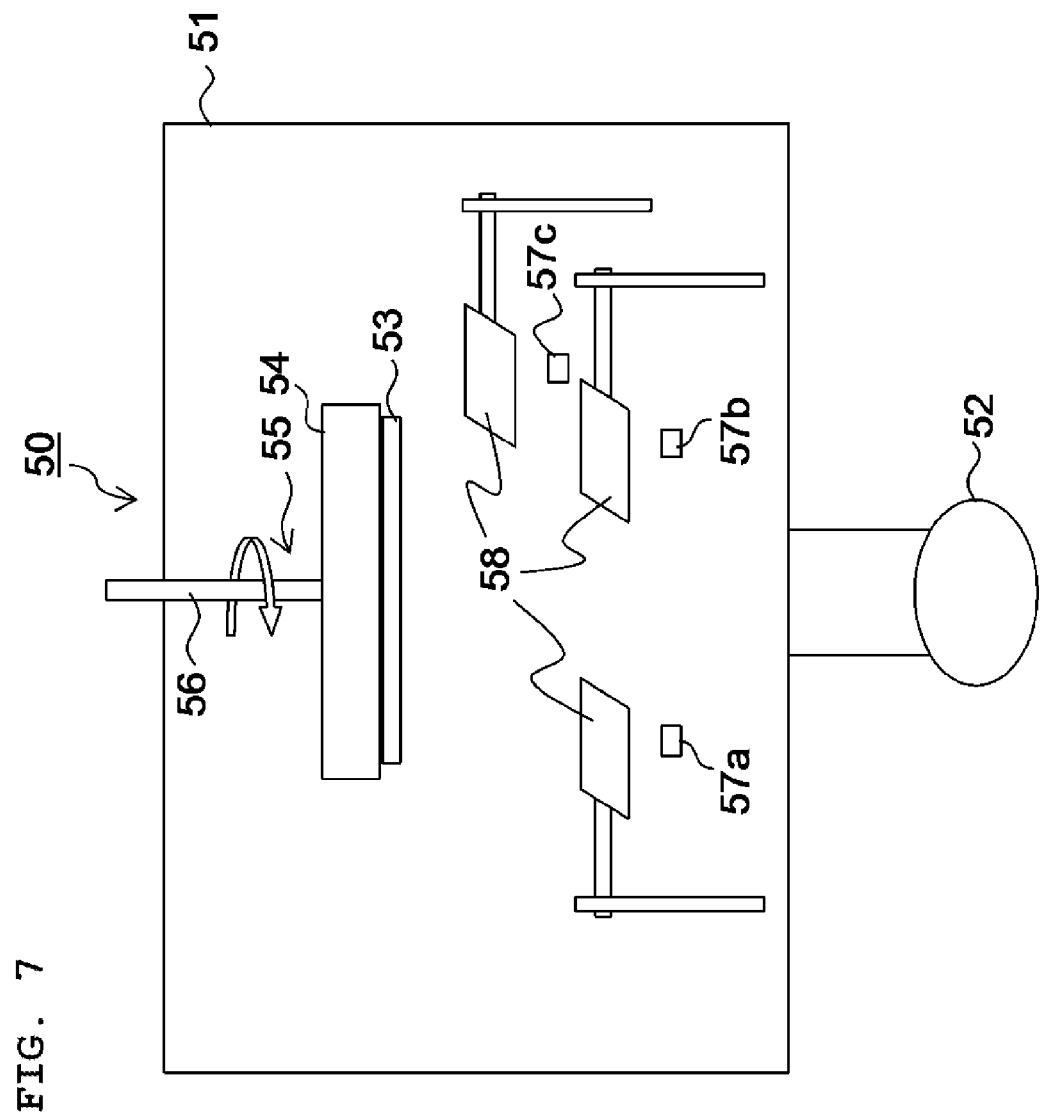
FIG. 7 is a schematic view illustrating another configuration of an exemplary deposition apparatus used in the invention.

As illustrated in FIG. 6, a deposition apparatus 50 has a box-shaped vacuum container 51, in which a deposition source 57 is arranged. The deposition source 57 is placed in a container furnished with a heating device, and may be heated by the operation of the heating device. For the formation of a scintillator layer 12, a phosphor raw material, or a mixture including a phosphor base material and an activator is loaded in the container furnished with a heating device. Namely, the phosphor raw material or the mixture as the deposition source 57 may be heated and vaporized by the operation of the heating device. As illustrated in FIG. 7, a plurality of deposition sources 57 may be disposed. While FIG. 7 illustrates three deposition sources 57, namely, deposition sources 57a, 57b and 57c, the number of deposition sources may be changed with respect to materials for forming the scintillator layer 12. The deposition sources may be arranged at regular or irregular intervals. The radius of the circle about the central line perpendicular to a deposition substrate 53 may be selected freely. This arrangement of deposition sources allows for in-plane uniformity of deposition over a large area. That is, deposition realizes uniform in-plane distribution over a large area so as to satisfy the aforementioned activator concentration, crystal diameters and film thickness distribution. Consequently, deposition may be effected not only on a single sheet of substrate but also on a plurality of substrate sheets simultaneously as required. Alternatively, deposition may be performed on a single large substrate, which may then be cut into a plurality of sheets, thereby realizing efficient production.

The container furnished with a heating device may be a resistance-heating crucible. Here, the material of the container may be alumina or a high-melting metal.

In the vacuum container 51, a holder 54 for holding the deposition substrate 53 is disposed immediately above the deposition source 57. Here, the deposition substrate 53 may be a support 11 itself or a stack of a support 11 with layers such as a reflective layer 13 and a protective layer.

The holder 54 is provided with a heater (not shown) and is configured to heat the deposition substrate 53 attached to the holder 54 by the operation of the heater. Heating of the deposition substrate 53 detaches or removes substances adsorbed to the surface of the deposition substrate 53, prevents an impurity layer from occurring between the deposition substrate 53 and the scintillator layer 12 formed on the substrate surface, increases the adhesion between the deposition substrate 53 and the scintillator layer 12, and controls the quality of the scintillator layer 12 formed on the surface of the deposition substrate 53.

The holder 54 is provided with a rotating mechanism 55 capable of rotating the holder 54. The rotating mechanism 55 is composed of a rotating shaft 56 connected to the holder 54, and a motor (not shown) which serves as a power supply driving the rotating shaft 56. Driving of the motor causes the rotating shaft 56 to be rotated and hence the holder 54 to be rotated while being opposed to the deposition source 57.

In addition to the above configuration, the deposition apparatus 50 includes a vacuum pump 52 connected to the vacuum container 51. The vacuum pump 52 evacuates the vacuum container 51 and introduces a gas to the inside of the vacuum container 51. The inside of the vacuum container 51 can be maintained in a constant pressure gas atmosphere by the operation of the vacuum pump 52. The vacuum pump 52 removes the gas present inside the vacuum container. In order to evacuate the vacuum container to a high vacuum, two or more types of vacuum pumps having different operating pressure ranges may be arranged. Examples of the vacuum pumps include rotary pumps, turbo-molecular pumps, cryogenic pumps, diffusion pumps and mechanical boosters.

In the formation of a scintillator layer 12 of the invention, a phosphor is loaded into the container furnished with a heating device, and the apparatus is evacuated while an inert gas such as nitrogen is simultaneously introduced through an inlet to adjust the pressure at about 1.333 Pa to $1.33 \times 10^{-3}$ Pa. Subsequently, the phosphor is heated and vaporized to deposit phosphor crystals onto the surface of the deposition substrate 53 which may have additional layers such as a reflective layer and a protective layer as required, thereby forming a scintillator layer 12. When the crystal deposition involves a mixture of a phosphor and an activator, a deposition apparatus 50 illustrated in FIG. 7 may be used, and the phosphor as the phosphor base material may be loaded into a first container furnished with a heating device and the activator into a second container furnished with a heating device to form deposition sources 57a and 57b, respectively.

To form a scintillator layer 12 having an underlayer 122 and a phosphor layer 121, a phosphor for the formation of underlayer 122, a phosphor for the formation of phosphor layer 121 and an activator for the formation of phosphor layer 121 may be loaded into respective containers having separate heating devices, and deposition may be performed while controlling the amounts of the deposition sources loaded and/or operating shutters 58 in accordance with the implementation of deposition of the respective deposition sources.

The crystal diameters of the columnar crystals formed on the deposition substrate 53 may be controlled by regulating the temperature of the deposition substrate 53. That is, the crystal diameters are increased with increasing temperature of the deposition substrate 53. The phosphor deposition rate and the pressure in the vacuum container 51 during deposition also have some effects on the crystal diameters. To ensure that the average crystal diameter b of the columnar crystals will be not more than 3 μm, the substrate temperature is preferably set at 5° C. to 320° C. provided that, for example, the deposition rate is not more than 3 μm/m and the vacuum degree is 0.01 to 1 Pa. Further, the rate of heating of the deposition substrate 53 at an initial stage of deposition is preferably controlled to an appropriately low rate in order to ensure the appropriately low ratio (b/a) of the average crystal diameter b of the columnar crystals at a height of 3 μm to the average crystal diameter a of the columnar crystals at a height of 1 μm. For example, it is preferable that the difference in substrate temperature is within 100° C. when root portions are deposited to a height of 3 μm. Heating of the deposition substrate 53 at an excessively high rate may cause local discontinuous changes in columnar crystal diameters in the scintillator layer 12. But the presence of such variations does not prevent the inventive radiographic image conversion panels 10 from functioning appropriately. The same applies to second radiographic image detectors 40 described later.

When the scintillator layer 12 includes an underlayer 122 and a phosphor layer 121, the thickness of the underlayer 122 defined in the section of "Scintillator layers" may be obtained by performing deposition while controlling the amount of phosphor base material loaded in the container furnished with a heating device (for example, a resistance-heating crucible) for the deposition of underlayer 122, or while operating the shutter 58. In order to ensure that the columnar crystals have independent root portions as well as that the obtainable radiographic image conversion panels achieve excellent X-ray characteristics such as brightness and sharpness, it is preferable that the temperature of the deposition substrate 53 during the formation of the underlayer 122 be 15° C. to 50° C., and it is particularly preferable that the deposition substrate 53 be not heated during the formation of the underlayer 122.

The phosphor layer 121 may be formed by depositing crystals onto the underlayer 122 in the same manner as above by heating and vaporizing a mixture of a phosphor base material and an activator compound loaded in a container furnished with a heating device, or by heating and vaporizing a phosphor base material and an activator compound loaded in respective containers furnished with separate heating devices. The thickness of the phosphor layer 121 may be adjusted by controlling the amount of phosphor base material (and activator) loaded in the container furnished with a heating device for the formation of phosphor layer 121, or by operating the shutter(s). Heating of the deposition substrate 53 is preferably started from the formation of the phosphor layer 121. During the formation of the phosphor layer 121, the temperature of the deposition substrate 53 is preferably 100° C. or above at the start of the formation of the phosphor layer 121, and is preferably maintained at 150° C. to 320° C. during the period until the deposition is completed.

The underlayer 122 may be defined in the scintillator layer 12 by feeding the phosphor base material at a lower rate per unit time during the course of deposition. That is, no underlayer 122 will be formed if the feed rate for the phosphor base material is not changed.

A scintillator layer 12 without an underlayer 122 may be formed by feeding the phosphor base material at a substantially constant rate per unit time during the formation of root portions as well as the formation of other upper portions. An example will be shown below in which the containers furnished with a heating device are resistance-heating crucibles. While performing heating of the deposition substrate 53, the first resistance-heating crucible containing the phosphor base material is heated to cause the phosphor base material to be deposited to form root portions. Thereafter, crystals are grown on the root portions by continuously heating the first resistance-heating crucible and optionally heating the second resistance-heating crucible containing an activator as required. In this process, additional resistance-heating crucibles containing the phosphor base material are not added.

A scintillator layer 12 having an underlayer 122 may be formed by feeding the phosphor base material at a lower rate per unit time during the formation of the underlayer 122 including root portions, and thereafter feeding the phosphor base material at a higher rate per unit time and at an increased temperature of the deposition substrate 53 to form a phosphor layer 121. An example will be shown below in which the containers furnished with a heating device are resistance-heating crucibles. First, the first resistance-heating crucible containing the phosphor base material is heated to cause the phosphor base material to be deposited to form an underlayer 122 including root portions. Thereafter, a phosphor layer 121 is formed by increasing the temperature of the deposition substrate 53 having the underlayer 122 while continuously heating the first resistance-heating crucible as well as by starting heating of the second resistance-heating crucible containing the phosphor base material and optionally heating of the third resistance-heating crucible containing an activator as required.

In both cases where the underlayer 122 is defined or is not formed in the scintillator layer 12, it is important that the phosphor be deposited without containing an activator during the formation of root portions in order for the root portions to be independent from one another. This configuration ensures that the crystals can distribute a load applied thereto when a pressure is given in the phosphor thickness direction, and sufficient strength may be obtained. In the formation of the phosphor layer 121 containing an activator, the phosphor and the activator are deposited after the formation of root portions on the deposition substrate 53, while performing heating of the entirety of the substrate including the root portions. This heating during the deposition of the phosphor and the activator causes the activator to migrate to the root portions. As a result, the root portions come to contain the activator in spite of the fact that the activator is not directly introduced into the root portions when they are deposited. Due to this phenomenon, brightness and sharpness are ensured while the root portions are independent from one another. That is, this configuration allows the radiographic image conversion panels to ensure brightness and sharpness while exhibiting sufficient strength.

On the other hand, the root portions may fail to form columns and may fail to be spaced apart from one another if the phosphor and the activator are deposited simultaneously during the formation of root portions. Consequently, sufficient brightness and sharpness may not be obtained.

Applications

The radiographic image conversion panels of the invention may be applied to various X-ray imaging systems. A particularly preferred application is to scintillator panels. Such scintillator panels may be used as radiographic image detectors in combination with photoelectric conversion element panels as will be described below.

[Radiographic Image Detectors]

In relation to the radiographic image conversion panels, the present invention also provides two types of radiographic image detectors having the scintillator layer described hereinabove.

The first type is a radiographic image detector 30 (also referred to as the "first radiographic image detector" in the specification) illustrated in FIG. 3 which includes the aforementioned radiographic image conversion panel 10 with the scintillator layer 12 in combination with a photoelectric conversion element panel 20. The second type is a radiographic image detector 40 (also referred to as the "second radiographic image detector" in the specification) illustrated in FIG. 5 which includes a scintillator layer 12' described later that is integral with a photoelectric conversion element panel 20.

In both types of radiographic image detectors, the scintillator layer (the scintillator layer 12 or the scintillator layer 12') converts incident X-rays into light, which is then converted by the photoelectric conversion element panel 20 into electric signals, and such signals can be output in relation to position information.

Photoelectric Conversion Element Panels

The photoelectric conversion element panels 20 used in the invention serve to convert light produced in the scintillator layer (the scintillator layer 12 or the scintillator layer 12') into electric signals and to output the signals to the outside. Conventional photoelectric conversion element panels may be used.

The configuration of the photoelectric conversion element panel 20 used in the invention is not particularly limited, but is usually such that a substrate, an image signal output layer and a photoelectric conversion element are stacked together in this order.

The photoelectric conversion element absorbs the light produced in the scintillator layer (the scintillator layer 12 or the scintillator layer 12') and converts it into the form of electric charges. The photoelectric conversion elements may have any structures as long as they function as such. For example, the photoelectric conversion elements used in the invention may have a transparent electrode, a charge generation layer that generates electric charges by being excited by the incident light, and a counter electrode. These transparent electrode, charge generation layer and counter electrode may be conventional. Alternatively, the photoelectric conversion elements used in the invention may be composed of appropriate photosensors. For example, the photoelectric conversion elements may be formed of a plurality of two-dimensionally arranged photodiodes or may be composed of two-dimensional photosensors such as charge coupled devices (CCDs) and complementary metal-oxide-semiconductor (CMOS) sensors.

The image signal output layer stores the charges generated in the photoelectric conversion element, and outputs signals based on the stored charges. The image signal output layers may have any structures. For example, the image signal output layers may be composed of a capacitor as a charge storage element that stores the charges generated in the photoelectric conversion element with respect to each pixel, and a transistor as an image signal output element that outputs the stored charges in the form of signals. A preferred example of the transistors is a thin film transistor (TFT).

The substrate of the photoelectric conversion element panel 20 may serve as a support of the radiographic image detector, and may be similar to the support 11 used in the radiographic image conversion panel 10 of the invention.

As described herein, various configurations of the photoelectric conversion element panels 20 may be used in the invention. For example, as will be described later in EXAMPLES of the invention, the photoelectric conversion element panels 20 may be formed of glass substrates on which a plurality of photodiodes and a plurality of TFT elements are disposed.

Further, the photoelectric conversion element panels 20 may include other components which may be incorporated in photoelectric conversion element panels in known radiographic image detectors, such as memory units that store image signals based on the X-ray intensity information and position information converted in the form of electric signals, power supply units that supply electric power required for the driving of the photoelectric conversion element panels 20, and communication output units for outputting the image information to the outside.

(First Radiographic Image Detectors)

The first radiographic image detector 30 of the invention includes a radiographic image conversion panel 10 and a photoelectric conversion element panel 20 described hereinabove.

An example of the first radiographic image detectors is illustrated in FIG. 3. As illustrated in FIG. 3, the first radiographic image detector 30 includes a combination of the radiographic image conversion panel 10 and the photoelectric conversion element panel 20 and is thereby configured such that incident X-rays are converted into light by the scintillator layer 12 constituting the radiographic image conversion panel 10, and the light is then converted into electric signals by the photoelectric conversion element constituting the photoelectric conversion element panel 20. In FIG. 3, a thick arrow indicates an example of X-ray incident directions.

To allow for efficient conversion, the first radiographic image detector 30 is preferably configured such that the radiographic image conversion panel 10 and the photoelectric conversion element panel 20 are coupled together while the scintillator layer 12 constituting the radiographic image conversion panel 10 is opposed to the photoelectric conversion element (not shown) constituting the photoelectric conversion element panel 20. In the case where the radiographic image conversion panel 10 has a reflective layer 13 between the support 11 and the scintillator layer 12, an advantage may be obtained in that the reflective layer 13 can reflect the portion of light produced in the scintillator layer 12 that is directed opposite to the photoelectric conversion element panel 20 back toward the photoelectric conversion element panel 20.

(Second Radiographic Image Detectors)

The second radiographic image detector of the invention includes a photoelectric conversion element panel and a scintillator layer disposed on the photoelectric conversion element panel. The scintillator layer includes a plurality of columnar crystals containing a phosphor. The plurality of columnar crystals have root portions, and the root portions are spaced apart from one another.

Figure 4:
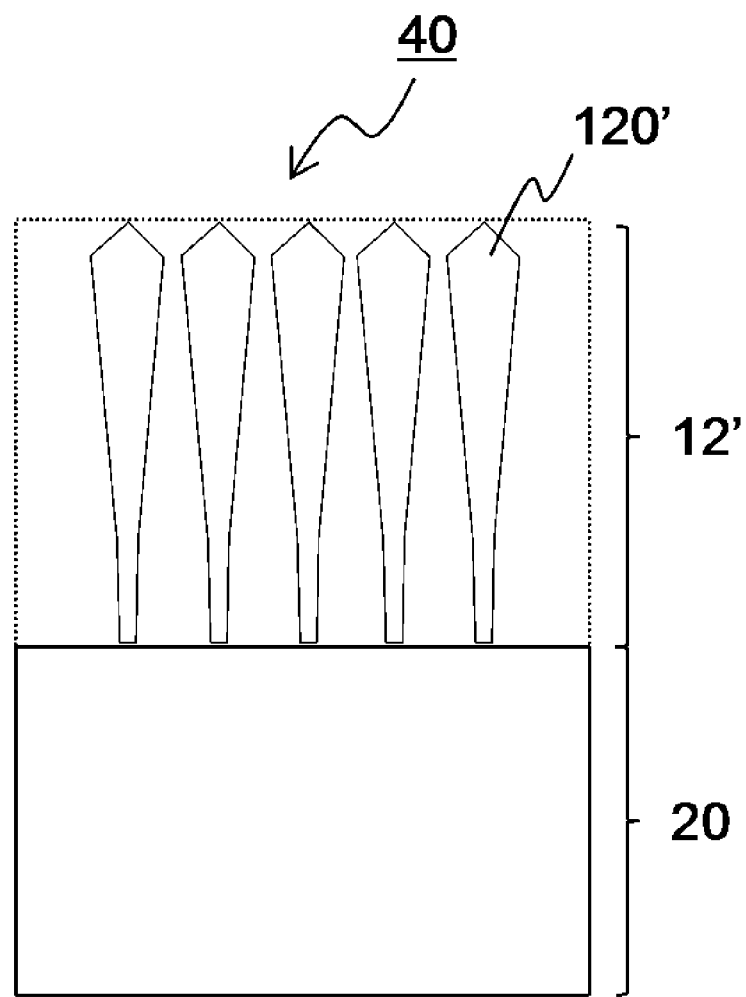
FIG. 4 is a schematic view illustrating a basic configuration of a second radiographic image detector of the invention.

FIG. 4 illustrates a basic configuration of the second radiographic image detector of the invention. In a second radiographic image detector 40, as illustrated in FIG. 4, a scintillator layer 12' is composed of a plurality of columnar crystals 120' containing a phosphor and the plurality of columnar crystals 120' have separate and independent root portions adjacent to a photoelectric conversion element panel 20. In other words, the second radiographic image detector 40 has a scintillator layer 12' similar to the scintillator layer 12 in the aforementioned radiographic image conversion panel 10, but differs from the radiographic image conversion panel 10 in that the scintillator layer 12' is disposed on the photoelectric conversion element panel 20 instead of on the support 11.

Figure 5:
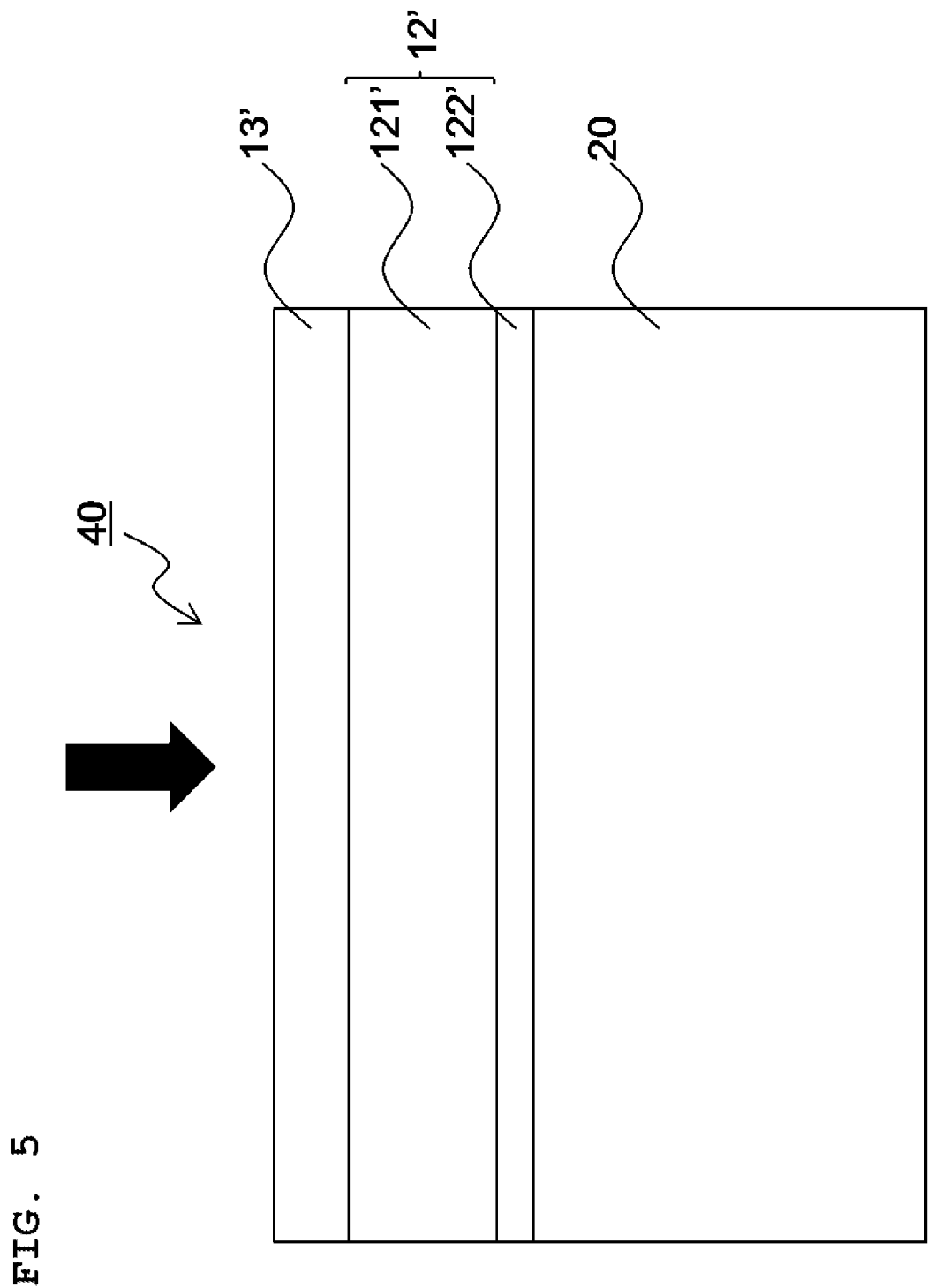
FIG. 5 is a schematic view illustrating an example of the second radiographic image detectors of the invention.

An example of the second radiographic image detectors is illustrated in FIG. 5. In FIG. 5, a thick arrow indicates an example of X-ray incident directions. In a more specific embodiment, as illustrated in FIG. 5, the second radiographic image detector 40 may further include additional layers such as a reflective layer 13'.

Because the second radiographic image detector 40 is an integral unit already including the photoelectric conversion element panel 20, it has a function to convert X-rays into light which is performed by the scintillator layer 12' as well as a function to convert the light into electric signals which is performed by the photoelectric conversion element panel 20. Thus, the second radiographic image detector 40 may output image data in the form of electric signals by itself.

Scintillator Layers

The second radiographic image detector 40 has the scintillator layer 12' on the photoelectric conversion element panel 20. In the case where the photoelectric conversion element panel 20 is a stack of a substrate, an image signal output layer and a photoelectric conversion element in this order, the scintillator layer 12' may be disposed on the photoelectric conversion element.

Similarly to the scintillator layer 12 constituting the radiographic image conversion panel 10, the scintillator layer 12' serves to convert the energy of incident radiations such as X-rays into light such as visible light.

In the second radiographic image detector 40 of the invention, the scintillator layer 12' includes a plurality of columnar crystals 120' containing a phosphor, and the plurality of columnar crystals 120' have root portions which are spaced apart from one another. The root portions of the plurality of columnar crystals 120 that constitute the scintillator layer 12' are usually directly or indirectly in touch with the photoelectric conversion element panel 20. For example, in the radiographic image detector 40 illustrated in FIG. 4, the root portions of the plurality of columnar crystals 120 that constitute the scintillator layer 12' are directly in touch with the photoelectric conversion element panel 20. However, the radiographic image detector 40 according to the invention may include an appropriate additional layer such as an intermediate resin layer mentioned below between the scintillator layer 12' and the photoelectric conversion element panel 20. In this case, the root portions of the plurality of columnar crystals 120 that constitute the scintillator layer 12' are indirectly in touch with the photoelectric conversion element panel 20 via the intermediate resin layer or the like.

In the second radiographic image detector 40 of the invention, the "root portions" are portions in the scintillator layer 12' which are found in the vicinity of the photoelectric conversion element panel 20. In detail, the root portions extend from the surface on the photoelectric conversion element panel 20 side, namely, the ends of crystals in the scintillator layer 12' on the photoelectric conversion element panel 20 side to a height of 3 μm.

The phosphor materials, the layer configurations, the film thickness and the shapes of columnar crystals of the scintillator layer 12' used in the second radiographic image detector 40 of the invention may be similar to those of the scintillator layer 12 constituting the radiographic image conversion panel 10.

That is, the scintillator layer 12' may be composed of a phosphor layer 121' alone having the similar composition and thickness to the phosphor layer 121 constituting the radiographic image conversion panel 10, or may include a phosphor layer 121' and an underlayer 122' having the similar composition and thickness to the underlayer 122 constituting the radiographic image conversion panel 10. When the scintillator layer 12' is composed of an underlayer 122' and a phosphor layer 121', the underlayer 122' and the phosphor layer 121' may be stacked in this order on the photoelectric conversion element panel 20.

The void content in the columnar crystals 120' forming the scintillator layer 12' may be defined as a ratio of the total sectional area of voids to the sum of the total sectional area of the columnar phosphor crystals plus the total sectional area of the voids with respect to a cross section of the scintillator layer 12' parallel to the plane of the photoelectric conversion element panel 20. The void content may be measured by the same method as the void content in the columnar crystals 120 forming the scintillator layer 12. The crystal diameters of the columnar crystals 120' constituting the scintillator layer 12', as measured at heights from the side adjacent to the photoelectric conversion element panel 20, may be similar as described above. That is, the average crystal diameter a' of the columnar crystals at a height of 1 μm, the average crystal diameter b' of the columnar crystals at a height of 3 μm, and the average crystal diameter c' of the columnar crystals at an uppermost portion of the scintillator layer 12' may be similar to the aforementioned average crystal diameters a, b and c specified for the scintillator layer 12 constituting the radiographic image conversion panel 10. Further, the (b'/a') ratio may be similar to the (b/a) ratio defined with respect to the radiographic image conversion panel 10. Furthermore, the coefficient of variation in the crystal diameters of the columnar crystals 120' may be preferably similar to that of the columnar crystals 120 constituting the scintillator layer 12 in the radiographic image conversion panel 10.

The scintillator layer 12' in the second radiographic image detector 40 may be formed by the same method as the scintillator layer 12 constituting the radiographic image conversion panel 10. The conditions in the scintillator layer formation may be similar to those for the formation of the scintillator layer 12 constituting the radiographic image conversion panel 10.

Additional Layers

As illustrated in FIG. 5, the second radiographic image detector 40 of the invention may further include a reflective layer 13' as well as an intermediate resin layer and a moistureproof protective layer which are not shown in addition to the photoelectric conversion element panel 20 and the scintillator layer 12', similarly to known radiographic image detectors.

Reflective Layers

Preferably, the second radiographic image detector 40 of the invention further includes a reflective layer 13' on the surface of the scintillator layer 12' opposite to the photoelectric conversion element panel 20, to allow the fluorescence produced in the scintillator layer 12' to be effectively directed to the photoelectric conversion element panel 20. In the second radiographic image detector 40, the reflective layer 13' is a layer capable of reflecting the portion of fluorescence produced in the scintillator layer 12', specifically the phosphor layer 121', that propagates in a direction opposite to the photoelectric conversion element panel 20.

In the second radiographic image detector 40 of the invention, the reflective layer 13' may be made of any of the materials which may be used for the reflective layer 13 in the radiographic image conversion panel 10. The film thickness and the film production methods may be similar to those for the reflective layer 13 in the radiographic image conversion panel 10.

Intermediate Resin Layers

The second radiographic image detector 40 of the invention may further include an intermediate resin layer as a partition between the photoelectric conversion element panel 20 and the scintillator layer 12'.

The intermediate resin layer is preferably formed by the application and drying of a solution of a resin in a solvent. From the viewpoint of the interlayer adherability with respect to the deposited crystals and to the photoelectric conversion element panel 20, the resins are preferably polymers having a glass transition temperature of 30 to 100° C.

Specific examples of the resins include polyurethane resins, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinylbutyrals, polyester resins, cellulose derivatives (such as nitrocellulose), styrene-butadiene copolymers, various synthetic rubber resins, phenolic resins, epoxy resins, urea resins, melamine resins, phenoxy resins, silicone resins, fluororesins, acrylic resins and urea formamide resins, with polyester resins being preferable. The resins may be used singly, or two or more may be used in combination. In particular, controlling of film properties is advantageously facilitated by combined use of two or more resins having a difference in glass transition temperature (Tg) of not less than 5° C. In this case, the two or more resins used in combination may be of the same kind or different kinds as long as their glass transition temperatures are different.

Alternatively, the intermediate resin layer may be formed by depositing a material such as polyparaxylylene with a device such as a CVD apparatus.

The thickness of the intermediate resin layer is preferably not less than 0.1 μm in view of adhesion, and is preferably not more than 3.0 μm in order to ensure smoothness on the surface of the intermediate resin layer. The thickness of the intermediate resin layer is more preferably in the range of 0.2 to 2.5 μm.

Examples of the solvents used for the formation of the intermediate resin layer include the solvents used for the formation of the protective layer in the radiographic image conversion panel 10.

Moistureproof Protective Layers

Preferably, the second radiographic image detector 40 of the invention further includes a moistureproof protective layer covering the outer periphery of scintillator layer 12'. The moistureproof protective layer serves to prevent the scintillator layer 12' from an entry of moisture and to suppress the degradation of the scintillator layer 12'.

The materials, the film thickness and the film formation methods for the moistureproof protective layers may be similar to those for the moistureproof protective layers in the radiographic image conversion panel 10.

Methods for Forming Second Radiographic Image Detectors

The second radiographic image detectors 40 of the invention may be produced by any methods without limitation as long as the object of the invention is achieved. Basically, the second radiographic image detectors 40 may be manufactured by any of known radiographic image detector manufacturing methods except that the scintillator layer 12' is produced by forming columnar phosphor crystals such that the root portions of the columnar crystals are spaced apart from one another.

In detail, the second radiographic image detector 40 may be obtained by optionally forming an intermediate resin layer as required in accordance with a known method onto a photoelectric conversion element in a photoelectric conversion element panel 20, then forming a scintillator layer 12' by the same method as that described in the section of "Methods for manufacturing radiographic image conversion panels", and optionally further forming additional layers such as a reflective layer and a moistureproof protective layer as required by known methods. When the scintillator layer 12' for constituting the second radiographic image detector 40 is formed with a deposition apparatus 50 illustrated in FIG. 6 or FIG. 7, the photoelectric conversion element panel 20 may be used as the deposition substrate 53 and the photoelectric conversion element side of the photoelectric conversion element panel 20 may serve as the deposition surface.

In this process, an approach may be adopted in which the side of the photoelectric conversion element panel 20 on which a phosphor layer 121' will be formed is maintained at 150 to 320° C. while performing cooling of the photoelectric conversion element panel 20 fixed to the holder 54 via the side opposite to the phosphor layer formation scheduled side. This approach prevents damages to the photoelectric conversion element panel 20 by heating. Here, the photoelectric conversion element panel 20 may be cooled with any tools or instrument without limitation. For example, the photoelectric conversion element panel 20 may be cooled by circulating water or a refrigerant through pipes (not shown) disposed inside the holder 54 and/or by using appropriate devices such as Peltier devices.

EXAMPLES

The present invention will be described in detail based on Examples hereinbelow without limiting the scope of the invention.

Example 1-1

Support

A 125 μm thick polyimide film was used as a support for a radiographic image conversion panel.
(Formation of Scintillator Layer)

A scintillator layer was formed on the support with a deposition apparatus 50 illustrated in FIG. 7 in the following manner. In this Example, the scintillator layer was composed of a phosphor layer alone without any underlayer.

First, a phosphor raw material (CsI) as a deposition material was loaded into a first resistance-heating crucible, and an activator (TlI) into a second resistance-heating crucible. The contents in these crucibles were deposition sources 57a and 57b, respectively. The support as a deposition substrate 53 was placed onto a rotatable holder 54. The gap between the deposition substrate 53 and the deposition sources 57 was adjusted to 400 mm.

Next, a vacuum container 51 in the deposition apparatus 50 was evacuated, and the degree of vacuum in the vacuum container 51 in the deposition apparatus 50 was adjusted to 0.5 Pa (absolute pressure) by introducing Ar gas. Thereafter, the deposition substrate 53 together with the holder 54 was rotated at 10 rpm, and the temperature of the deposition substrate 53 was controlled to 250° C. at the start of deposition. The first resistance-heating crucible was heated to allow the phosphor to be deposited onto the scintillator formation scheduled surface of the deposition substrate, thereby forming 3 μm thick root portions of a phosphor layer to be formed.

After the formation of root portions, the temperature of the deposition substrate 53 was controlled to 200° C., and heating of the second resistance-heating crucible was started. The phosphor and the activator were thus deposited onto the scintillator formation scheduled surface of the deposition substrate to form, on the root portions, upper portions for constituting the phosphor layer. In this process, the deposition rate for the activator was adjusted by controlling the heating temperature for the second resistance-heating crucible such that the activator concentration in the scintillator layer would be 0.3 mol %. Here, the heating of the deposition substrate was performed by heating the holder 54.

The deposition was terminated when the thickness of the scintillator layer reached 400 μm. Thus, a scintillator panel was obtained which had the scintillator layer in the prescribed film thickness on the scintillator formation scheduled surface of the deposition substrate 53.

Example 1-2

Support

A 125 μm thick polyimide film was used as a support for a radiographic image conversion panel.
(Formation of Scintillator Layer)

A scintillator layer was formed on the support with a deposition apparatus 50 illustrated in FIG. 7 in the following manner. In this Example, the scintillator layer included an underlayer and a phosphor layer. In this Example, root portions were present in the underlayer.

First, a phosphor raw material (CsI) as a deposition material was loaded into two resistance-heating crucibles, and an activator (TlI) into another resistance-heating crucible. The resistance-heating crucibles containing the phosphor raw material were the first and second resistance-heating crucibles, and the resistance-heating crucible containing the activator was the third resistance-heating crucible. The contents in these first, second and third resistance-heating crucibles were deposition sources 57a, 57b and 57c, respectively. The support as a deposition substrate 53 was placed onto a rotatable holder 54. The gap between the deposition substrate 53 and the deposition sources 57a, 57b and 57c was adjusted to 400 mm.

Next, a vacuum container 51 in the deposition apparatus 50 was evacuated, and the degree of vacuum in the vacuum container 51 in the deposition apparatus 50 was adjusted to 0.5 Pa (absolute pressure) by introducing Ar gas. Thereafter, the deposition substrate 53 together with the holder 54 was rotated at 10 rpm.

The first resistance-heating crucible was heated to allow the phosphor to be deposited onto the scintillator formation scheduled surface of the deposition substrate, thereby forming a 3 μm thick underlayer portion. During this process, the temperature of the deposition substrate 53 was 5° C. at the start of deposition, and was gradually increased. The temperature of the deposition substrate 53 was 25° C. when the 3 μm thick underlayer portion was formed.

Subsequently, the temperature of the deposition substrate 53 was controlled to 200° C., and the second and third resistance-heating crucibles were heated to cause the phosphor and the activator to be deposited onto the scintillator formation scheduled surface of the deposition substrate, thereby forming a phosphor layer portion. The activator concentration in the scintillator layer was controlled to be 0.3 mol %.

The deposition was terminated when the thickness of the scintillator layer reached 400 μm. Thus, a scintillator panel was obtained which had the scintillator layer in the prescribed film thickness on the scintillator formation scheduled surface of the deposition substrate 53.

Example 1-3

A scintillator panel was obtained by the same method and under the same conditions as in Example 1-2, except that the underlayer portion was formed in such a manner that the thickness of the underlayer portion was changed to 50 μm.

Example 1-4

A scintillator panel was obtained by the same method and under the same conditions as in Example 1-2, except that the underlayer portion was formed in such a manner that the temperature of the deposition substrate 53 was 5° C. at the start of deposition and was maintained at 5° C. until the underlayer portion was formed in a thickness of 3 μm.

Example 1-5

A scintillator panel was obtained by the same method and under the same conditions as in Example 1-3, except that the underlayer portion was formed in such a manner that the temperature of the deposition substrate 53 was 5° C. at the start of deposition and was maintained at 5° C. until the underlayer portion was formed in a thickness of 3 μm.

Example 1-6

A scintillator panel was obtained by the same method and under the same conditions as in Example 1-1, except that the temperature of the deposition substrate 53 was 150° C. at the start of deposition and was thereafter gradually raised to reach 250° C. when the root portions was formed in a thickness of 3 μm.

Example 1-7

A scintillator panel was obtained by the same method and under the same conditions as in Example 1-2, except that the underlayer portion was formed in such a manner that the temperature of the deposition substrate 53 was 150° C. at the start of deposition and was thereafter gradually raised to reach 250° C. when the underlayer portion was formed in a thickness of 3 μm.

Example 1-8

A scintillator panel was obtained by the same method and under the same conditions as in Example 1-7, except that the underlayer portion was formed in such a manner that the thickness of the underlayer portion was changed to 50 μm.

Example 1-9

A scintillator panel was obtained by the same method and under the same conditions as in Example 1-2, except that the underlayer portion was formed in such a manner that the thickness of the underlayer portion was changed to 60 μm.

Comparative Example 1

A scintillator panel was obtained by the same method and under the same conditions as in Example 1-1, except that the phosphor layer was formed in such a manner that both the first resistance-heating crucible and the second resistance-heating crucible were heated during the formation of 3 μm root portions and the formation of upper portions on the root portions.

Example 2-1

A scintillator panel was obtained by the same method and under the same conditions as in Example 1-6, except that the temperature of the deposition substrate 53 was 150° C. at the start of deposition and was thereafter gradually raised to reach 300° C. when the root portions was formed in a thickness of 3 μm.

Example 2-2

A scintillator panel was obtained by the same method and under the same conditions as in Example 1-1, except that the temperature of the deposition substrate 53 was 300° C. at the start of deposition.

Example 2-3

A scintillator panel was obtained by the same method and under the same conditions as in Example 1-7, except that the underlayer portion was formed in such a manner that the temperature of the deposition substrate 53 was 80° C. at the start of deposition and was thereafter gradually raised to reach 250° C. when the underlayer portion was formed in a thickness of 3 μm.

Example 2-4

A scintillator panel was obtained by the same method and under the same conditions as in Example 1-1, except that the temperature of the deposition substrate 53 was controlled to 320° C. after the root portions were deposited in a thickness of 3 μm.

Example 3-1

Photoelectric Conversion Element Panel

A photoelectric conversion element panel was obtained by forming a plurality of photodiodes and a plurality of TFT elements on a glass substrate.

This photoelectric conversion element panel was used as a substrate for a scintillator layer.

(Formation of Scintillator Layer)

A scintillator layer was formed with a deposition apparatus illustrated in FIG. 7 by the same method and under the same conditions as in Example 1-1, except that the 125 μm thick polyimide film as the support was replaced by the above photoelectric conversion element panel. A radiographic image detector was thus obtained.

Here, the formation of scintillator layer took place on the side of the photoelectric conversion element panel on which the photoelectric conversion elements were disposed.

Example 3-2

Photoelectric Conversion Element Panel

A photoelectric conversion element panel was obtained by forming a plurality of photodiodes and a plurality of TFT elements on a glass substrate.

This photoelectric conversion element panel was used as a substrate for a scintillator layer.
(Formation of Scintillator Layer)

A scintillator layer was formed with a deposition apparatus illustrated in FIG. 7 by the same method and under the same conditions as in Example 1-2, except that the 125 μm thick polyimide film as the support was replaced by the above photoelectric conversion element panel. A radiographic image detector was thus obtained.

Here, the formation of scintillator layer took place on the side of the photoelectric conversion element panel on which the photoelectric conversion elements were disposed.

Example 3-3

A radiographic image detector was obtained by the same method and under the same conditions as in Example 3-2, except that the underlayer portion was formed in such a manner that the thickness of the underlayer portion was changed to 50 μm.

Example 3-4

A radiographic image detector was obtained by the same method and under the same conditions as in Example 3-2, except that the underlayer portion was formed in such a manner that the temperature of the deposition substrate 53 was 5° C. at the start of deposition and was maintained at 5° C. until the underlayer portion was formed in a thickness of 3 μm.

Example 3-5

A radiographic image detector was obtained by the same method and under the same conditions as in Example 3-3, except that the underlayer portion was formed in such a manner that the temperature of the deposition substrate 53 was 5° C. at the start of deposition and was maintained at 5° C. until the underlayer portion was formed in a thickness of 3 μm.

Example 3-6

A radiographic image detector was obtained by the same method and under the same conditions as in Example 3-1, except that the temperature of the deposition substrate 53 was 150° C. at the start of deposition and was thereafter gradually raised to reach 250° C. when the root portions was formed in a thickness of 3 μm.

Example 3-7

A radiographic image detector was obtained by the same method and under the same conditions as in Example 3-2, except that the underlayer portion was formed in such a manner that the temperature of the deposition substrate 53 was 150° C. at the start of deposition and was thereafter gradually raised to reach 250° C. when the underlayer portion was formed in a thickness of 3 μm.

Example 3-8

A radiographic image detector was obtained by the same method and under the same conditions as in Example 3-7, except that the underlayer portion was formed in such a manner that the thickness of the underlayer portion was changed to 50 μm.

Example 3-9

A radiographic image detector was obtained by the same method and under the same conditions as in Example 3-2, except that the underlayer portion was formed in such a manner that the thickness of the underlayer portion was changed to 60 μm.

Comparative Example 2

A radiographic image detector was obtained by the same method and under the same conditions as in Example 3-1, except that the phosphor layer was formed in such a manner that both the first resistance-heating crucible and the second resistance-heating crucible were heated during the formation of 3 μm root portions and the formation of upper portions on the root portions.

Example 4-1

A radiographic image detector was obtained by the same method and under the same conditions as in Example 3-6, except that the temperature of the deposition substrate 53 was 150° C. at the start of deposition and was thereafter gradually raised to reach 300° C. when the root portions was formed in a thickness of 3 μm.

Example 4-2

A radiographic image detector was obtained by the same method and under the same conditions as in Example 3-1, except that the temperature of the deposition substrate 53 was 300° C. at the start of deposition.

Example 4-3

A radiographic image detector was obtained by the same method and under the same conditions as in Example 3-7, except that the underlayer portion was formed in such a manner that the temperature of the deposition substrate 53 was 80° C. at the start of deposition and was thereafter gradually raised to reach 250° C. when the underlayer portion was formed in a thickness of 3 μm.

Example 4-4

A radiographic image detector was obtained by the same method and under the same conditions as in Example 3-1, except that the temperature of the deposition substrate 53 was controlled to 320° C. after the root portions were deposited in a thickness of 3 μm.

[Evaluations of Scintillator Panels and Radiographic Image Detectors]

The scintillator panels and the radiographic image detectors obtained in Examples and Comparative Examples were evaluated with respect to the following items. To evaluate brightness and MTF, the scintillator panels in Examples 1-1 to 1-9 and 2-1 to 2-4 and in Comparative Example 1 were set onto PaxScan (FPD: 2520 manufactured by Varian; hereinafter "FPD") to form radiographic image detectors. Such radiographic image detectors and the radiographic image detectors obtained in Examples 3-1 to 3-9 and 4-1 to 4-4 and in Comparative Example 2 were tested by the methods described below to evaluate their brightness and MTF. The results are described in Tables 1-1 and 1-2.

Average Crystal Diameters a, b and c

The average crystal diameters in each of the scintillator panels and the radiographic image detectors were measured as follows.

The columnar crystal scintillator layer was coated with platinum palladium alloy, and was analyzed with a scanning electron microscope (SEM) (S-800 manufactured by Hitachi, Ltd.) to determine circular equivalent diameters which are the diameters of circles circumscribed around the cross sections of respective columnar crystals. The thus-obtained circular equivalent diameters of thirty columnar crystals were averaged.

The average crystal diameter a of the columnar crystals at a height of 1 μm, and the average crystal diameter b of the columnar crystals at a height of 3 μm were each obtained as an average of circular equivalent crystal diameters measured by the observation of crystal faces exposed by filling the crystals with an epoxy resin and polishing the surface of the crystal film until the thickness from the support side became 1 μm and 3 μm, respectively.

The average crystal diameter c of the columnar crystals at an uppermost portion of the scintillator layer was obtained as an average of circular equivalent crystal diameters measured by the observation of crystal faces exposed by grinding the columnar crystals by 10 μm from the side opposite to the support side.

Brightness

With an illuminator having a tube voltage of 80 kVp, the FPD was illuminated with X-rays. The obtained image data was analyzed to determine the average signal value. The brightness was evaluated based on this average signal value as the amount of luminescence. In Tables 1-1 and 1-2, the amounts of luminescence were represented by "○": 1 time (equivalent) to less than 1.2 times, and "⊙": 1.2 times or greater than the amount of luminescence obtained in Comparative Example 1 taken as 1.0.

MTF

With an illuminator having a tube voltage of 80 kVp, the radiation incident side of the FPD was illuminated with X-rays through a lead MTF chart. The image data was detected and was recorded on a hard disk. Thereafter, the image data recorded on the hard disk was analyzed with a computer to determine the MTF value (at a spatial frequency of 1 cycle/mm) of the X-ray image recorded on the hard disk, as the indicator of sharpness. A larger value of MTF, which is an abbreviation for modulation transfer function, indicates higher sharpness.

The MTF values were measured with respect to nine locations in the radiographic image conversion panel or the radiographic image detector, and the results were averaged. Tables 1-1 and 1-2 represent the MTF values by "x": less than 0.8 times, "Δ": 0.8 to less than 1.0 time, "○": 1.0 time (equivalent) to less than 1.2 times, and "⊙": 1.2 times or greater than the acceptable value obtained in Example 2-2.

Strength

The scintillator panel or the radiographic image detector was subjected to a pressure which was increased to 1.5 MPa, 1.7 MPa or 2.0 MPa with a press machine, and thereafter the surface of the scintillator panel or the radiographic image detector was observed with a SEM to inspect for any crystal deformations. The strength was evaluated based on the maximum pressure that the scintillator panel or the radiographic image detector withstood without any crystal deformations, namely, "x": less than 1.5 MPa, "Δ": 1.5 MPa to less than 1.7 MPa, "○": 1.7 MPa to less than 2 MPa, and "⊙": 2 MPa or more.

TABLE 1-1

| | Support | Root portions | a (μm) | b (μm) | b/a | c (μm) | Scintillator layer thickness (μm) | Underlayer (μm) | Brightness | MTF | Strength |
|---|---|---|---|---|---|---|---|---|---|---|---|
| Comp. Ex. 1 | Polyimide film | Not columnar | — | 3 | — | 7 | 397 | — | ○ | Δ | X |
| Ex. 1-1 | | Columnar | 3 | 3 | 1 | 7 | 400 | — | ⊙ | ○ | ○ |
| Ex. 1-2 | | Columnar | 0.05 | 0.15 | 3 | 4 | 410 | 3 | ⊙ | ⊙ | ⊙ |
| Ex. 1-3 | | Columnar | 0.05 | 0.15 | 3 | 4 | 405 | 50 | ⊙ | ⊙ | ⊙ |
| Ex. 1-4 | | Columnar | 0.05 | 0.05 | 1 | 3 | 402 | 3 | ⊙ | ⊙ | ⊙ |
| Ex. 1-5 | | Columnar | 0.05 | 0.05 | 1 | 3 | 395 | 50 | ⊙ | ⊙ | ⊙ |
| Ex. 1-6 | | Columnar | 1 | 3 | 3 | 7 | 390 | — | ⊙ | ○ | ○ |
| Ex. 1-7 | | Columnar | 1 | 3 | 3 | 7 | 405 | 3 | ⊙ | ⊙ | ○ |
| Ex. 1-8 | | Columnar | 1 | 3 | 3 | 7 | 408 | 50 | ⊙ | ⊙ | ○ |
| Ex. 1-9 | | Columnar | 1 | 3 | 3 | 7 | 405 | 60 | ○ | ⊙ | ○ |
| Ex. 2-1 | | Columnar | 1 | 4 | 4 | 10 | 400 | — | ⊙ | ○ | Δ |
| Ex. 2-2 | | Columnar | 4 | 4 | 1 | 10 | 393 | — | ⊙ | Δ | ○ |
| Ex. 2-3 | | Columnar | 0.5 | 3 | 6 | 7 | 403 | 3 | ⊙ | ○ | Δ |
| Ex. 2-4 | | Columnar | 3 | 3 | 1 | 12 | 410 | — | ⊙ | Δ | ○ |

TABLE 1-2

| | Support | Root portions | a (μm) | b (μm) | b/a | c (μm) | Scintillator layer thickness (μm) | Underlayer (μm) | Brightness | MTF | Strength |
|---|---|---|---|---|---|---|---|---|---|---|---|
| Comp. Ex. 2 | Photoelectric conversion element panel | Not columnar | — | 3 | — | 8 | 510 | — | ○ | Δ | X |
| Ex. 3-1 | | Columnar | 3 | 3 | 1 | 8 | 502 | — | ⊙ | ⊙ | ○ |
| Ex. 3-2 | | Columnar | 0.07 | 0.24 | 3 | 4 | 495 | 3 | ⊙ | ⊙ | ○ |
| Ex. 3-3 | | Columnar | 0.07 | 0.24 | 3 | 4 | 505 | 50 | ○ | ⊙ | ⊙ |

TABLE 1-2-continued

| | Support | Root portions | a (μm) | b (μm) | b/a | c (μm) | Scintillator layer thickness (μm) | Underlayer (μm) | Brightness | MTF | Strength |
|---|---|---|---|---|---|---|---|---|---|---|---|
| Ex. 3-4 | | Columnar | 0.07 | 0.07 | 1 | 3 | 500 | 3 | ⊙ | ⊙ | ○ |
| Ex. 3-5 | | Columnar | 0.07 | 0.07 | 1 | 3 | 490 | 50 | ○ | ⊙ | ⊙ |
| Ex. 3-6 | | Columnar | 1 | 3 | 3 | 8 | 507 | — | ⊙ | ⊙ | ○ |
| Ex. 3-7 | | Columnar | 1 | 3 | 3 | 8 | 512 | 3 | ⊙ | ⊙ | ○ |
| Ex. 3-8 | | Columnar | 1 | 3 | 3 | 7 | 490 | 50 | ○ | ⊙ | ○ |
| Ex. 3-9 | | Columnar | 1 | 3 | 3 | 7 | 505 | 60 | ○ | ⊙ | ○ |
| Ex. 4-1 | | Columnar | 1 | 4 | 4 | 10 | 497 | — | ⊙ | ○ | Δ |
| Ex. 4-2 | | Columnar | 4 | 4 | 1 | 10 | 495 | — | ⊙ | ○ | Δ |
| Ex. 4-3 | | Columnar | 0.5 | 3 | 6 | 7 | 503 | 3 | ⊙ | ○ | Δ |
| Ex. 4-4 | | Columnar | 3 | 3 | 1 | 13 | 507 | — | ⊙ | Δ | Δ |

REFERENCE SIGNS LIST

10 . . . INVENTIVE RADIOGRAPHIC IMAGE CONVERSION PANEL
90 . . . CONVENTIONAL RADIOGRAPHIC IMAGE CONVERSION PANEL
11, 91 . . . SUPPORT
12, 12', 92 . . . SCINTILLATOR LAYER
120, 120', 920 . . . COLUMNAR CRYSTALS
121, 121' . . . PHOSPHOR LAYER
122, 122' . . . UNDERLAYER
13, 13' . . . REFLECTIVE LAYER
20 . . . PHOTOELECTRIC CONVERSION ELEMENT PANEL
30 . . . FIRST RADIOGRAPHIC IMAGE DETECTOR
40 . . . SECOND RADIOGRAPHIC IMAGE DETECTOR
50 . . . DEPOSITION APPARATUS
51 . . . VACUUM CONTAINER
52 . . . VACUUM PUMP
53 . . . DEPOSITION SUBSTRATE
54 . . . HOLDER
55 . . . ROTATING MECHANISM
56 . . . ROTATING SHAFT
57, 57a, 57b, 57c . . . DEPOSITION SOURCE
58 . . . SHUTTERS

What is claimed is:

1. A radiographic image conversion panel comprising:
a support and a scintillator layer disposed on the support, the scintillator layer including a plurality of columnar crystals containing a phosphor,
the plurality of columnar crystals having root portions, the root portions being spaced apart from one another,
wherein the root portions are in touch with the support or with an optional layer interposed between the support and the scintillator layer, the optional layer being selected from the group consisting of a reflective layer and a protective layer, and
wherein the columnar crystals satisfy the relationship $1 \leq (b/a) \leq 3$ wherein the letter a is the average crystal diameter of the columnar crystals at a height of 1 μm, and the letter b is the average crystal diameter of the columnar crystals at a height of 3 μm, both heights being values from the side adjacent to the support, and the average crystal diameter b is not more than 3 μm.

2. The radiographic image conversion panel according to claim 1, wherein the columnar crystals have an average crystal diameter c of not more than 10 μm as measured with respect to an uppermost portion of the scintillator layer, and the thickness of the scintillator layer is 100 to 1,000 μm.

3. A radiographic image detector comprising the radiographic image conversion panel described in claim 2 and a photoelectric conversion element panel.

4. The radiographic image conversion panel according to claim 1, wherein the scintillator layer includes an underlayer and a phosphor layer, and the underlayer and the phosphor layer are stacked in this order on the support.

5. The radiographic image conversion panel according to claim 4, wherein the thickness of the underlayer is 3 to 50 μm.

6. A radiographic image detector comprising the radiographic image conversion panel described in claim 4 and a photoelectric conversion element panel.

7. The radiographic image conversion panel according to claim 1, wherein the scintillator layer has local discontinuous changes in crystal diameters of the columnar crystals.

8. A radiographic image detector comprising the radiographic image conversion panel described in claim 7 and a photoelectric conversion element panel.

9. The radiographic image conversion panel according to claim 1, wherein the scintillator layer includes columnar crystals formed by a gas-phase deposition method.

10. A radiographic image detector comprising the radiographic image conversion panel described in claim 9 and a photoelectric conversion element panel.

11. A radiographic image detector comprising the radiographic image conversion panel described in claim 1 and a photoelectric conversion element panel.

12. A radiographic image detector comprising:
a photoelectric conversion element panel and a scintillator layer disposed on the photoelectric conversion element panel,
the scintillator layer including a plurality of columnar crystals containing a phosphor,
the plurality of columnar crystals having root portions, the root portions being spaced apart from one another,
wherein the root portions are in touch with the photoelectric conversion element panel or with an intermediate resin layer interposed between the photoelectric conversion element panel and the scintillator layer, and
wherein the columnar crystals satisfy the relationship $1 \leq (b'/a') \leq 3$ wherein the letter a' is the average diameter of the columnar crystals at a height of 1 μm, and the letter b' is the average crystal diameter of the columnar crystals at a height of 3 μm, both heights being values from the side adjacent to the photoelectric conversion element panel, and the average crystal diameter b' is not more than 3 μm.

13. The radiographic image detector according to claim 12, wherein the columnar crystals have an average crystal diameter c' of not more than 10 μm as measured with respect to an uppermost portion of the scintillator layer, and the thickness of the scintillator layer is 100 to 1,000 μm.

14. The radiographic image detector according to claim 12, wherein the scintillator layer includes an underlayer and a phosphor layer, and the underlayer and the phosphor layer are stacked in this order on the photoelectric conversion element panel.

15. The radiographic image detector according to claim 14, wherein the thickness of the underlayer is 3 to 50 μm.

16. The radiographic image detector according to claim 12, wherein the scintillator layer has local discontinuous changes in crystal diameters of the columnar crystals.

17. The radiographic image detector according to claim 12, wherein the scintillator layer includes columnar crystals formed by a gas-phase deposition method.

* * * * *